United States Patent
McFetridge et al.

(10) Patent No.: US 11,951,697 B2
(45) Date of Patent: Apr. 9, 2024

(54) SCALABLE AREA GRIPPER, SYSTEM, AND METHOD FOR A MATERIAL HANDLING PROCESS FOR COMPOSITE MANUFACTURING

(71) Applicant: The Boeing Company, Chicago, IL (US)

(72) Inventors: Shaun A. McFetridge, Melbourne (AU); Benjamin S. Zielinski, Melbourne (AU)

(73) Assignee: The Boeing Company, Arlington, VA (US)

(*) Notice: Subject to any disclaimer, the term of this patent is extended or adjusted under 35 U.S.C. 154(b) by 16 days.

(21) Appl. No.: 17/548,580

(22) Filed: Dec. 12, 2021

(65) Prior Publication Data

US 2023/0182409 A1    Jun. 15, 2023

(51) Int. Cl.
*B32B 41/00* (2006.01)
*B25J 15/06* (2006.01)
(Continued)

(52) U.S. Cl.
CPC ........... *B29C 70/38* (2013.01); *B25J 15/0625* (2013.01); *B29C 70/342* (2013.01); *B29C 70/54* (2013.01);
(Continued)

(58) Field of Classification Search
CPC ....... B29C 70/38; B29C 70/342; B29C 70/54; B25J 15/0625; B25J 9/10; G05B 19/4155; G05B 2219/39561
(Continued)

(56) References Cited

U.S. PATENT DOCUMENTS

| | | |
|---|---|---|
| 10,537,981 B2 | 1/2020 | Lee et al. |
| 2008/0080962 A1* | 4/2008 | Holtmeier ............ B66C 1/0243 414/627 |

(Continued)

FOREIGN PATENT DOCUMENTS

| | | |
|---|---|---|
| DE | 202009014155 U1 | 2/2010 |
| DE | 202014100337 U1 | 5/2015 |
| WO | 2021087448 A1 | 5/2021 |

OTHER PUBLICATIONS

Extended European Search Report (EESR), European Patent Office, dated May 12, 2023, for corresponding Application No. EP22203752.5, Applicant The Boeing Company, 9 pages.
(Continued)

*Primary Examiner* — Michael N Orlando
*Assistant Examiner* — Joshel Rivera

(57) ABSTRACT

There is provided a scalable area gripper that includes a structural frame and variable vacuum zones coupled to the structural frame. Each variable vacuum zone includes (i) vacuum ports, (ii) one or more movable barrier elements, and (iii) an actuator assembly to move each of the one or more movable barrier elements across one or more of the vacuum port(s), to cause the one or more vacuum port(s) to go between a closed state and an open state. One or more of the variable vacuum zone(s) is configured to be adjusted to each provide an adjusted vacuum zone that corresponds to a corresponding identified section of a material having a start portion and an end portion. Each adjusted vacuum zone is configured to be positioned adjacent to its corresponding identified section of the material, and is configured to be activated to pick up the material during a material handling process.

20 Claims, 22 Drawing Sheets

(51) Int. Cl.
  *B29C 70/34*  (2006.01)
  *B29C 70/38*  (2006.01)
  *B29C 70/54*  (2006.01)
  *G05B 19/4155*  (2006.01)
  *B25J 9/10*  (2006.01)

(52) U.S. Cl.
  CPC ............ *G05B 19/4155* (2013.01); *B25J 9/10* (2013.01); *G05B 2219/39561* (2013.01)

(58) Field of Classification Search
  USPC .................... 156/60, 64, 350, 351, 378, 379
  See application file for complete search history.

(56) References Cited

U.S. PATENT DOCUMENTS

| | | |
|---|---|---|
| 2010/0040450 A1 | 2/2010 | Parnell |
| 2012/0330453 A1 | 12/2012 | Samak Sangari et al. |
| 2021/0130025 A1* | 5/2021 | Schaafsma ............ B65B 59/003 |
| 2022/0176649 A1* | 6/2022 | Krajca .................... B29C 70/38 |

OTHER PUBLICATIONS

Pending U.S. Appl. No. 17/495,722, entitled "Automated Bi-Stable Valve System and Method of Using the Same for Composite Manufacturing", Shaun A. McFetridge, et al., filed Oct. 6, 2021, Applicant The Boeing Company, 87 pages.

\* cited by examiner

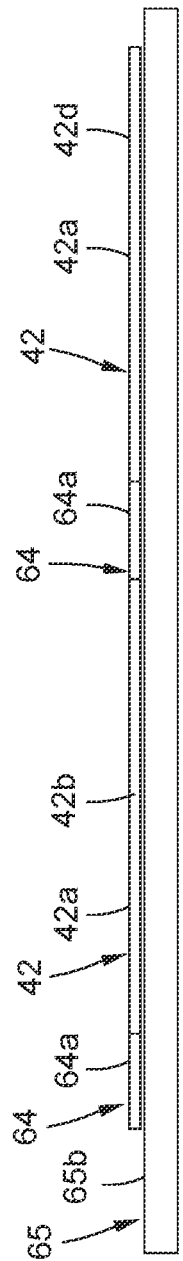

SCALABLE AREA GRIPPER, SYSTEM, AND METHOD FOR A MATERIAL HANDLING PROCESS FOR COMPOSITE MANUFACTURING

FIELD

The disclosure relates generally to the manufacture of composite structures, such as those used in the aircraft industry, and relates more particularly, to an apparatus, system, and method for handling material, such as plies, during a material handling process for composite manufacturing.

BACKGROUND

Composite structures may be used in a wide variety of applications, including in the manufacture of aircraft, due to their high strength-to-weight ratios, corrosion resistance and other favorable properties. In particular, in aircraft manufacturing, composite structures may be used to form the fuselage, wings, tail sections, and other parts of the aircraft.

Such composite structures may be formed from composite laminates comprising multiple stacked composite plies, or layers, laminated together. Prior to forming the composite laminates, the composite plies may be cut from rolls or sheets of dry, raw fiber material, for example, unidirectional fiber material, creating a ply nest, and then picked up and typically separated from adjacent waste material. Handling of cut composite plies made of unidirectional fiber material may be difficult due to lack of stiffness in a non-fiber direction. Further, when picking up such cut composite plies from within the ply nest, for example, with a robot, it is desirable for ply adhesion not to extend past the ply edges, so as to leave waste material behind and to prevent disturbance of other cut composite plies in the ply nest. Additionally, such cut composite plies may present in any rotation or geometry. Thus, control of ply adhesion, including a very fine control over where adhesion is applied to a surface of a cut composite ply is desirable.

Pneumatic valves are typically used in industrial applications where the on/off flow of air, such as compressed air, is controlled. However, because such pneumatic valves are optimized for compressed air, they may not be suitable for pulling vacuum. Moreover, such pneumatic valves are typically individually controlled. Where multiple valves, such as multiple pneumatic valves, are used, valve blocks may be needed to consolidate electronic controls and the plumbing of the air supply. However, such valve blocks, as well as such pneumatic valves, may be bulky in size and heavy in weight, and it may be difficult to arrange them sufficiently close together to achieve a high density of adhesion zones to pick up less stiff materials.

In addition, the textile industry has a known method for automated material handling of flexible materials that includes adding temporary stiffening agents into the material during the manufacturing process. However, such known method is undesirable for aerospace applications, and in particular, it is undesirable to add temporary stiffening agents to primary aircraft structures, such as fuselage, wings, and tail sections.

Further, passive check valves are used in some area vacuum grippers that rely on air flow, where the object is not to restrict the air flow, to close the valve. However, such area vacuum grippers with passive check valves do not have discrete control of adhesion zones to pick up less stiff materials, and the entire pick surface of such area vacuum grippers is either active or inactive. Thus, such area vacuum grippers may not be suitable to selectively pick up multiple cut composite plies from across a ply nest.

Accordingly, there is a need for a scalable area gripper, system, and method for handling and selectively removing material, such as cut composite plies, in composite manufacturing, that provide simplified adhesion area control based on ply boundaries and a determination of a start portion and an end portion of an identified section of a ply, that avoid a need for discrete control along a length of the identified section, and that provide additional advantages over known apparatuses, systems, and methods.

SUMMARY

Example implementations of the present disclosure provide a scalable area gripper, system, and method for a material handling process in composite manufacturing. As discussed in the below detailed description, versions of the scalable area gripper, system, and method may provide significant advantages over known apparatuses, methods, and systems.

In a version of the disclosure, there is provided a scalable area gripper. The scalable area gripper comprises a structural frame and a plurality of variable vacuum zones coupled to the structural frame.

Each variable vacuum zone comprises, (i) a plurality of vacuum ports, (ii) one or more movable barrier elements, and (iii) an actuator assembly configured to move each of the one or more movable barrier elements across one or more of the plurality of vacuum ports, to cause the one or more plurality of vacuum ports to go between a closed state and an open state.

One or more of the plurality of variable vacuum zones is configured to be adjusted to each provide an adjusted vacuum zone that corresponds to a corresponding identified section of a material having a start portion and an end portion. Each adjusted vacuum zone is configured to be positioned adjacent to its corresponding identified section of the material, and is configured to be activated to pick up the material during a material handling process.

In another version of the disclosure, there is provided an automated material handling system for a material handling process in composite manufacturing. The automated material handling system comprises a material to be picked up and removed from a work surface. The automated material handling system further comprises a robot with an end effector.

The automated material handling system further comprises a scalable area gripper system. The scalable area gripper system comprises a scalable area gripper having a structural frame and a plurality of variable vacuum zones coupled to the structural frame. Each variable vacuum zone comprises, (i) a plurality of vacuum ports, (ii) one or more movable barrier elements, and (iii) an actuator assembly configured to move each of the one or more movable barrier elements across one or more of the plurality of vacuum ports, to cause the one or more plurality of vacuum ports to go between a closed state and an open state.

The scalable area gripper system further comprises a control system a control system coupled to the scalable area gripper. The automated material handling system further comprises a vacuum system coupled to the scalable area gripper. The vacuum system has a vacuum supply to provide air flow through the one or more plurality of vacuum ports in the open state.

The scalable area gripper system is configured to adjust one or more of the plurality of variable vacuum zones, to each provide an adjusted vacuum zone that corresponds to a corresponding identified section of the material having a start portion and an end portion. The scalable area gripper system is configured to position each adjusted vacuum zone adjacent to its corresponding identified section of the material, and is configured to activate the adjusted vacuum zone, to pick up and remove the material from the work surface during the material handling process in the composite manufacturing.

In another version of the disclosure, there is provided a method of picking up a ply in a material handling process for composite manufacturing. The method comprises the step of providing a scalable area gripper system. The scalable area gripper system comprises a scalable area gripper having a structural frame and a plurality of variable vacuum zones coupled to the structural frame. Each variable vacuum zone comprises, (i) a plurality of vacuum ports, (ii) one or more movable barrier elements, and (iii) an actuator assembly configured to move each of the one or more movable barrier elements across one or more of the plurality of vacuum ports, to cause the one or more plurality of vacuum ports to go between a closed state and an open state. The scalable area gripper system further comprises a control system coupled to the scalable area gripper.

The method further comprises the step of coupling the scalable area gripper to a vacuum system and to an end effector attached to a robot. The method further comprises the step of identifying, with the control system, a plurality of sections of the ply. The method further comprises the step of identifying, with the control system, a start portion and an end portion of each identified section of the ply, based on boundaries of the ply.

The method further comprises the step of adjusting one or more of the plurality of variable vacuum zones, to each provide an adjusted vacuum zone that corresponds to its corresponding identified section of the ply. The method further comprises the step of positioning the adjusted vacuum zone adjacent to its corresponding identified section of the ply.

The method further comprises the step of activating the adjusted vacuum zone to provide air flow, with the vacuum system, through the plurality of vacuum ports along the adjusted vacuum zone. The method further comprises the step of picking up the ply, with the scalable area gripper, from a work surface, during the material handling process for the composite manufacturing.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings, which illustrate preferred and exemplary versions, but which are not necessarily drawn to scale. The drawings are examples and not meant as limitations on the description or claims.

FIG. 5D is an illustration of a cross-section view of cut plies and waste material, taken along lines 5D-5D of FIG. 5C;

The figures shown in this disclosure represent various aspects of the versions presented, and only differences will be discussed in detail.

DETAILED DESCRIPTION

Disclosed versions will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

This specification includes references to "one version" or "a version". The instances of the phrases "one version" or "a version" do not necessarily refer to the same version. Particular features, structures, or characteristics may be combined in any suitable manner consistent with this disclosure.

As used herein, "comprising" is an open-ended term, and as used in the claims, this term does not foreclose additional structures or steps.

As used herein, "configured to" means various parts or components may be described or claimed as "configured to" perform a task or tasks. In such contexts, "configured to" is used to connote structure by indicating that the parts or components include structure that performs those task or tasks during operation. As such, the parts or components can be said to be configured to perform the task even when the specified part or component is not currently operational (e.g., is not on).

As used herein, the terms "first", "second", etc., are used as labels for nouns that they precede, and do not imply any type of ordering (e.g., spatial, temporal, logical, etc.).

As used herein, an element or step recited in the singular and preceded by the word "a" or "an" should be understood as not necessarily excluding the plural of the elements or steps.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

Figure 1:
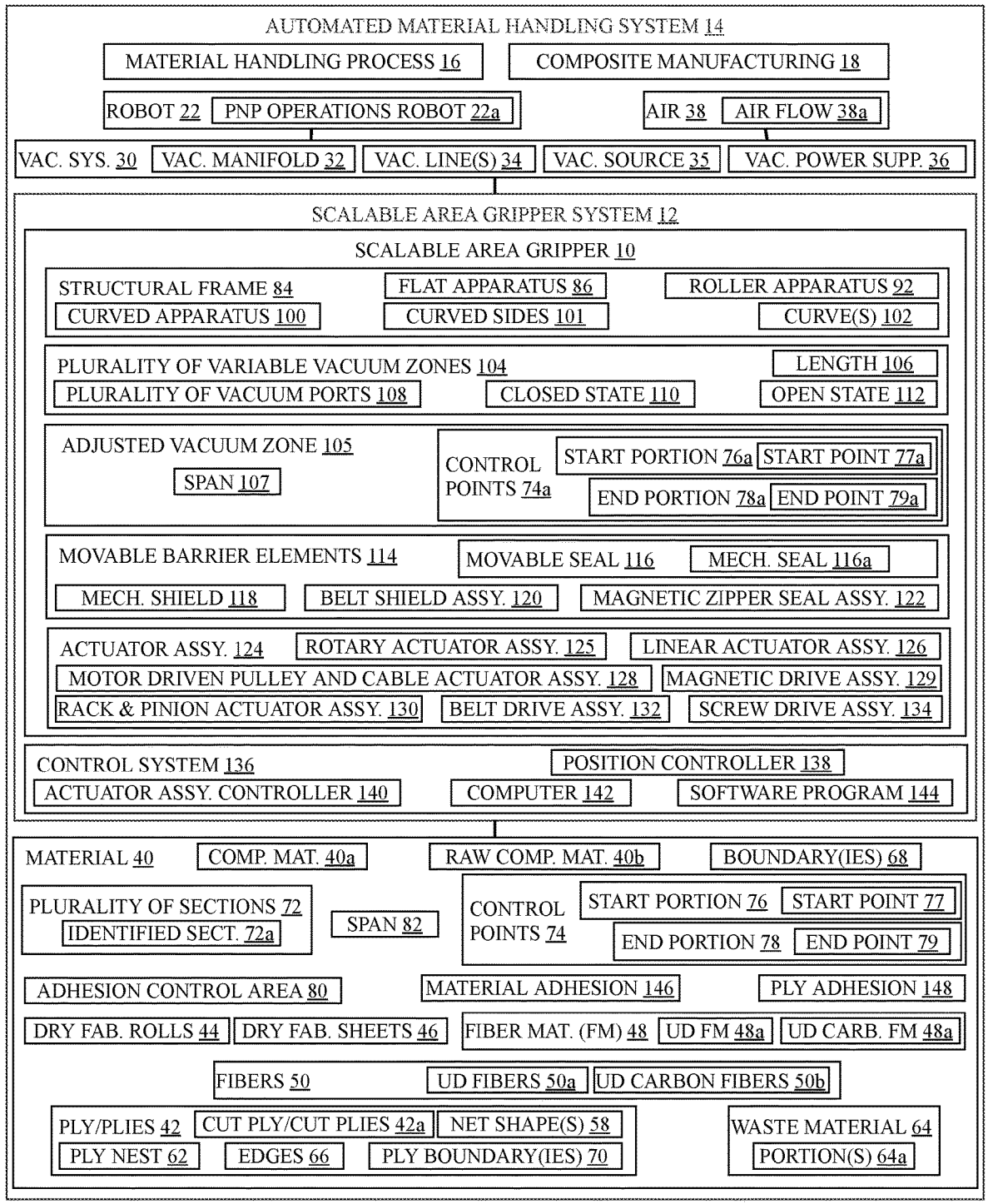
FIG. 1 is an illustration of a functional block diagram showing exemplary versions of a scalable area gripper and a scalable area gripper system of the disclosure, used in an exemplary version of an automated material handling system of the disclosure.

Now referring to the Figures, FIG. 1 is an illustration of a functional block diagram showing exemplary versions of a scalable area gripper 10 that is part of a scalable area gripper system 12 of the disclosure, used in an exemplary version of an automated material handling system 14 of the disclosure. The blocks in FIG. 1 represent elements, and lines connecting the various blocks do not imply any particular dependency of the elements. Furthermore, the connecting lines shown in the various Figures contained herein are intended to represent example functional relationships and/or physical couplings between the various elements, but it is noted that other alternative or additional functional relationships or physical connections may be present in versions disclosed herein. One or more of these blocks may be combined, divided, or combined and divided into different blocks when implemented in an illustrative example.

Further, the illustrations of the scalable area gripper 10, the scalable area gripper system 12, and the automated material handling system 14 in FIG. 1 are not meant to imply physical or architectural limitations to the manner in which illustrative examples may be implemented. Other components in addition to, or in place of, the ones illustrated may be used. Some components may be unnecessary.

In one version of the disclosure, as shown in FIG. 1, there is provided the scalable area gripper 10 that is part of the scalable area gripper system 12. In another version of the disclosure, as shown in FIG. 1, there is provided the automated material handling system 14 for a material handling process 16 in composite manufacturing 18 of composite structures 20, where the automated material handling system 14 includes the scalable area gripper system 12 with the scalable area gripper 10.

As shown in FIG. 1, in one exemplary version, the automated material handling system 14 comprises a robot 22 (see also FIG. 4), such as a pick-and-place (PNP) operations robot 22a. The robot 22 has an arm 24 (see FIG. 4) with an end effector 26 (see FIG. 4). The end effector 26 has a first end 28a (see FIG. 4) and a second end 28b (see FIG. 4). The scalable area gripper 10 is coupled to the first end 28a of the end effector 26, and the second end 28b of the end effector 26 is coupled to the arm 24 of the robot 22. The scalable area gripper 10 is held by the robot 22, via the end effector 26.

As shown in FIG. 1, the automated material handling system 14 further comprises a vacuum (VAC) system 30 having a portion coupled to the end effector 26 or another suitable part of the robot 22, and having a portion coupled to the scalable area gripper 10. As shown in FIG. 1, the vacuum system (VAC. SYS.) 30 comprises a vacuum (VAC.) manifold 32, one or more vacuum (VAC.) lines 34, a vacuum (VAC.) source 35, and a vacuum (VAC.) power supply (SUPP.) 36. The vacuum source 35 may comprise a vacuum generator 35a (see FIG. 4), a blower, or another suitable vacuum source, configured to pull air 38 (see FIG. 1) in an air flow 38a (see FIG. 1), or vacuum flow, through the one or more vacuum lines 34, the vacuum manifold 32, and the scalable area gripper 10. The vacuum system 30 may further comprise one or more control valves, shutoff valves, and/or other suitable vacuum system components. The vacuum manifold 32 is coupled to the scalable area gripper 10, via one or more vacuum lines 34, and the vacuum manifold 32 is coupled to the vacuum source 35, via one or more vacuum lines 34.

As shown in FIG. 1, the automated material handling system 14 further comprises a material 40, such as a composite material (COMP. MAT.) 40a, for example, raw composite material (COMP. MAT.) 40b, in the form of one or more plies 42, or layers, such as one or more cut plies 42a, to be picked up by the robot 22 using the scalable area gripper 10 during the material handling process 16 in the composite manufacturing 18. The robot 22 positions the scalable area gripper 10 over the top of the material 40, such as the composite material 40a, for example, the raw composite material 40b, in the form of one or more plies 42, such as one or more cut plies 42a, prior to pick up and removal.

The material 40, such as the composite material 40a, for example, raw composite material 40b, is supplied in the form of carbon or non-carbon dry fabric (FAB.) rolls 44 (see FIGS. 1, 3), dry fabric (FAB.) sheets 46 (see FIGS. 1, 2), or another suitable form, comprised of fiber material (FM) 48, such as unidirectional (UD) fiber material (FM) 48a, for example, unidirectional (UD) carbon (CARB.) fiber material (FM) 48b. As shown in FIG. 1, the fiber material 48 comprises fibers 50, such as unidirectional (UD) fibers 50a, for example, unidirectional (UD) carbon fibers 50*b*. The fibers 50 may be stitched together with threads 52 (see FIG. 2) to form a stitched unidirectional fabric 54 (see FIG. 2), may have tackifiers to hold the fibers 50 together, or may be held together in another suitable manner. The fibers 50 may be made from natural and/or man-made materials such as carbon, fiberglass, graphite, and the like. The material 40, such as the composite material 40*a*, for example, the raw composite material 40*b*, has stiffness in a fiber direction 55 (see FIG. 2) but has a low bending stiffness, or no stiffness, in a non-fiber direction 56 (see FIG. 2), or in any direction relative to the fibers 50. The composite material 40*a* may further comprise carbon fiber reinforced polymer (CFRP) materials, including plastic or thermoplastic materials.

Figure 2:
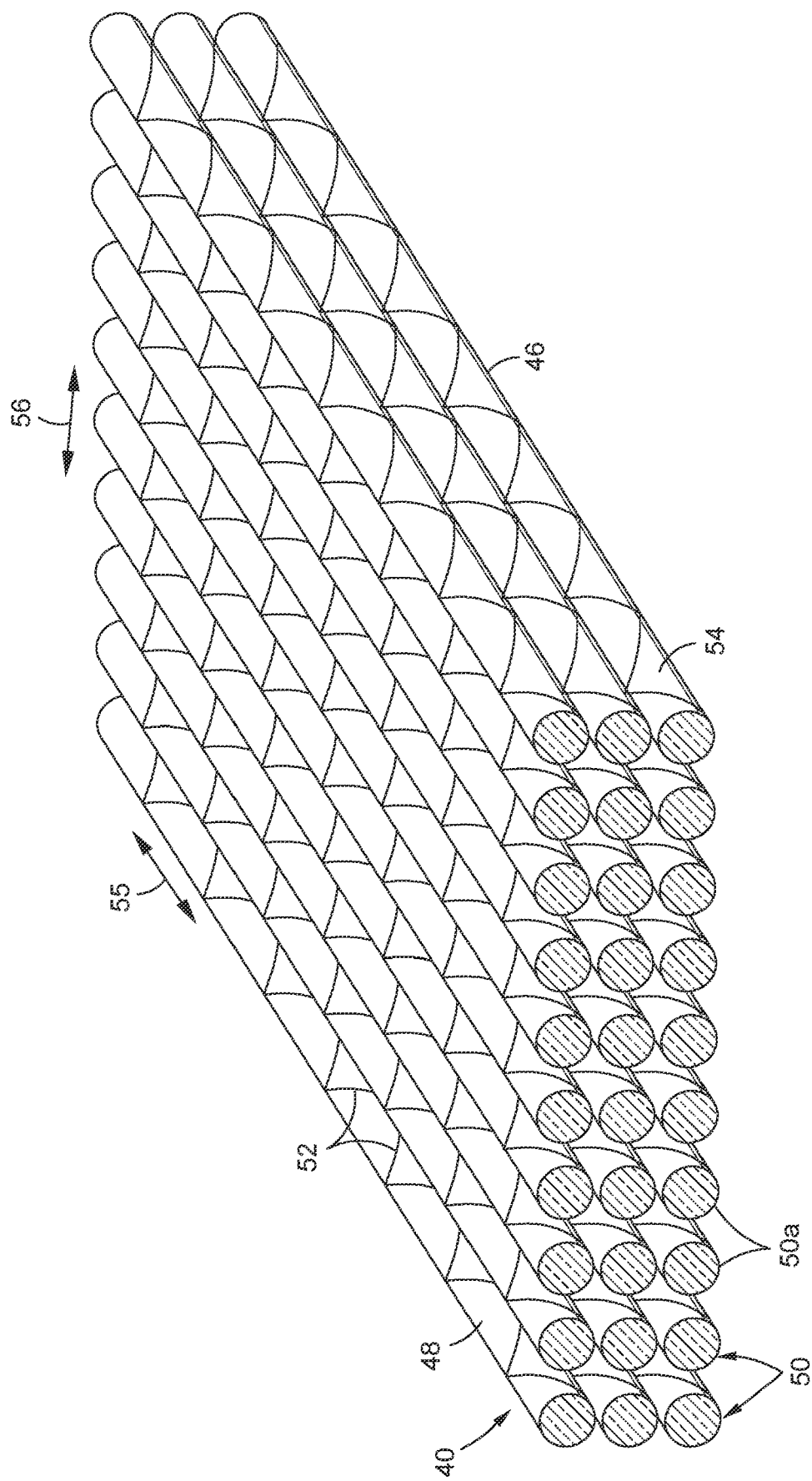
FIG. 2 is an illustration of a front perspective view of an exemplary version of fiber material having unidirectional fibers that may be used with versions of the automated material handling system and the scalable area gripper system of the disclosure.
Figure 3:
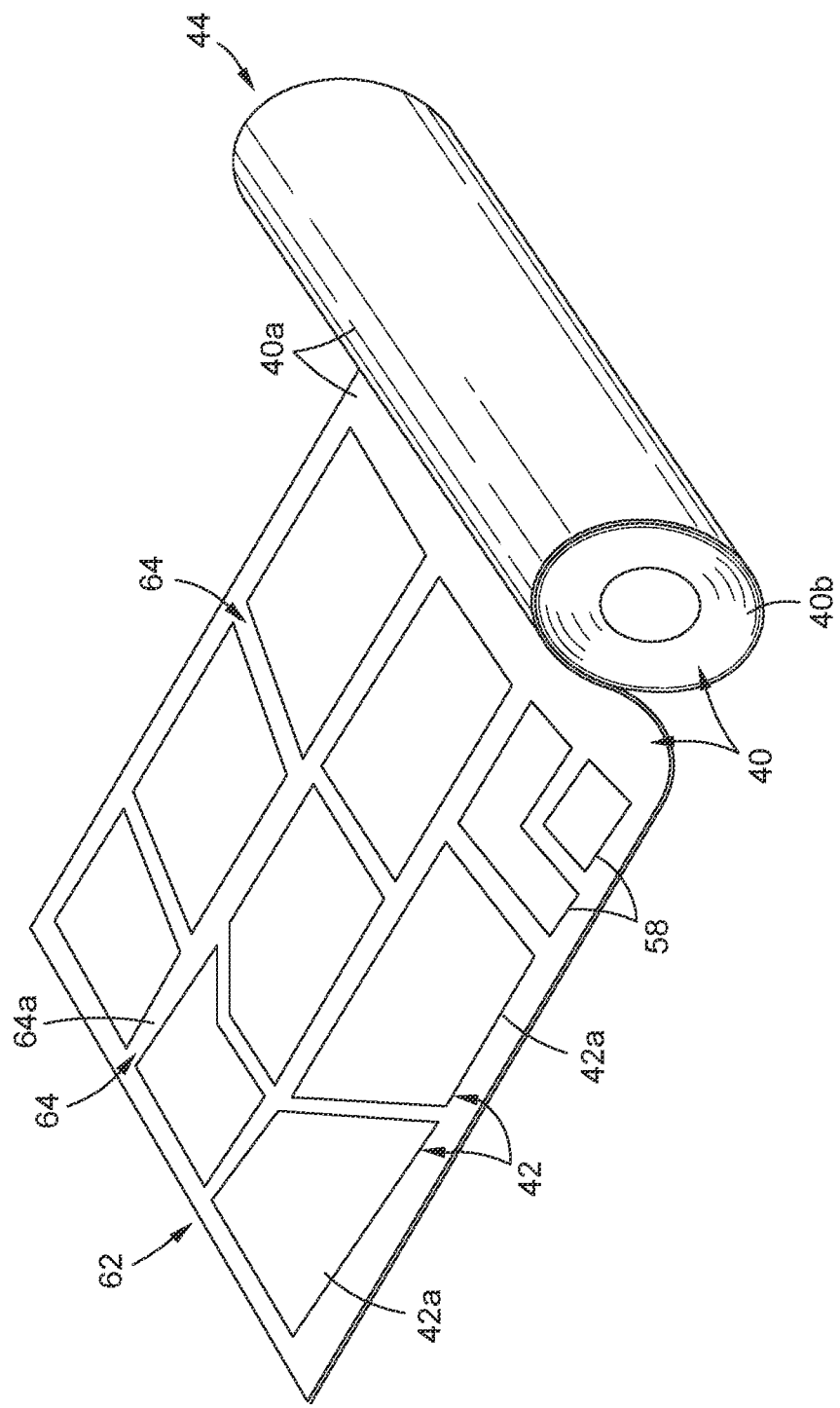
FIG. 3 is an illustration of a side perspective view of an exemplary version of a dry fabric roll of material showing cut plies arranged in a ply nest.

Prior to the plies 42, or layers, of the material 40, such as the composite material 40*a*, being picked up by the robot 22 using the scalable area gripper 10, the plies 42 are cut from the dry fabric rolls 44 (see FIG. 3), dry fabric sheets 46 (see FIG. 2), or other suitable form, into net shapes 58 (see FIGS. 1, 3) with a cutter apparatus 60 (see FIG. 4), such as an automated cross-cutter apparatus 60*a* (see FIG. 4), to form cut plies 42*a* (see FIGS. 1, 3) arranged in a ply nest 62 (see FIGS. 1, 3). The plies 42, such as the cut plies 42*a*, in the ply nest 62 are adjacent to non-cut material or non-cut composite material, comprising waste material 64 (see FIGS. 1, 3), also referred to as skeleton material, or scrap material. The plies 42, such as the cut plies 42*a*, in the ply nest 62 are configured to be picked up and placed by the robot 22 using the scalable area gripper 10, and separated from the remaining material, such as the remaining composite material, comprising the waste material 64 (see FIGS. 1, 3) that is not picked up. One or more portions 64*a* (see FIGS. 1, 3) of the waste material 64 may be discarded or recycled for re-use.

One or more plies 42, such as one or more cut plies 42*a*, in the ply nest 62 can be selectively picked up from a work surface 65 (see FIG. 4) by the robot 22, using the scalable area gripper 10, and removed or moved from the work surface 65, to a tool or mold for laying up, or to a carrier apparatus, a kitting tray, a mobile apparatus, or another suitable apparatus for transport. The work surface 65 (see FIG. 4) may comprise a conveyor belt 65*a* (see FIG. 4), a cutting table 65*b* (see FIG. 5D), a mobile table, a carrier apparatus, a tool, or another suitably flat surface. The material 40, such as the composite material 40*a*, in the form of one or more plies 42, such as one or more cut plies 42*a*, is selectively picked up from the work surface 65 by the robot 22, using the scalable area gripper 10, and the waste material 64, or skeleton material or scrap material, is not picked up and is left on the work surface 65 for removal and discarding or reuse. The scalable area gripper 10 picks up and holds each ply 42, such as each cut ply 42*a*, to edges 66 (see FIGS. 1, 3) of the ply 42, such as the cut ply 42*a*, and does not go past the edges 66, thus avoiding picking up the waste material 64, or skeleton material or scrap material.

Figure 5A:
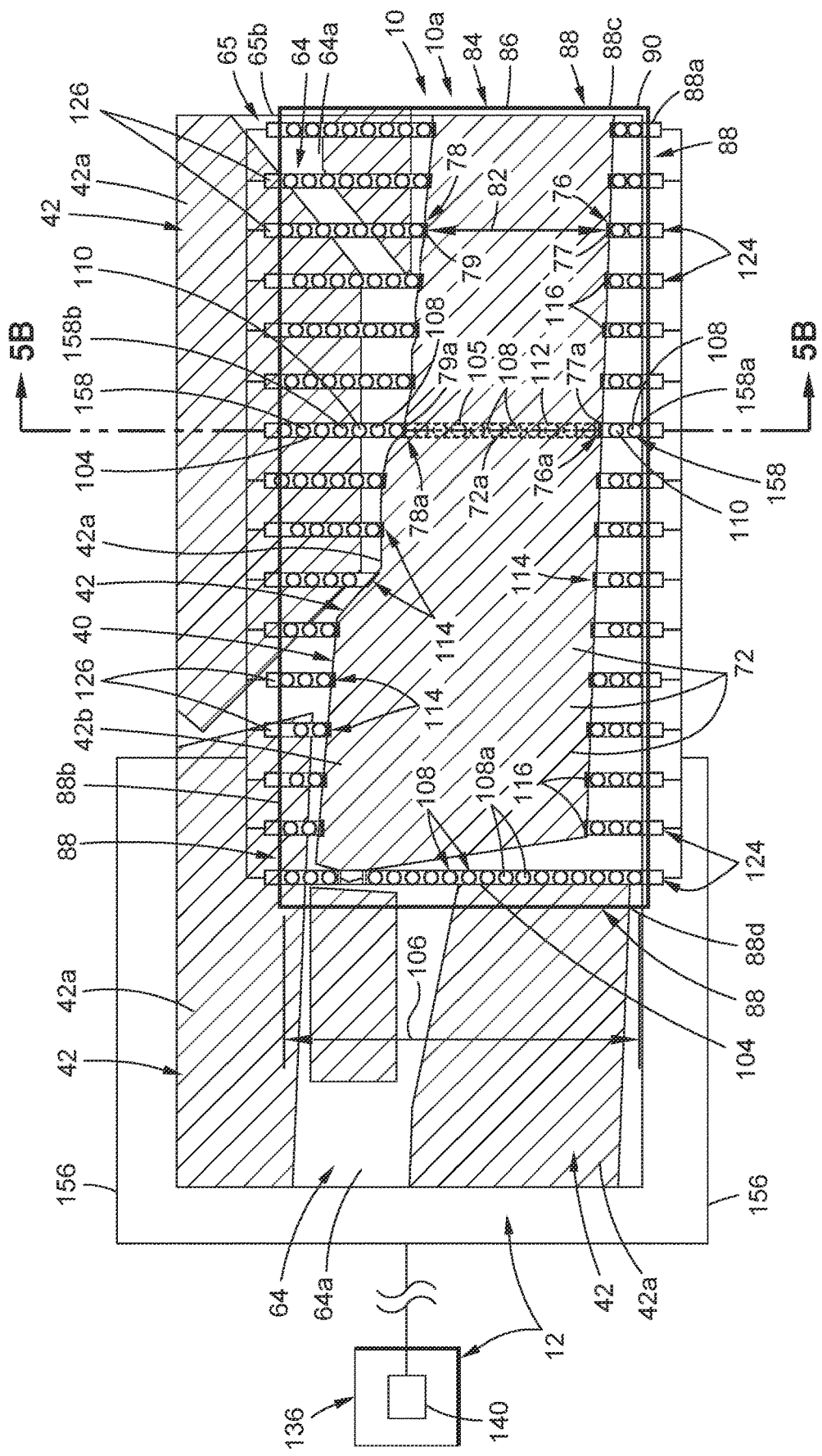
FIG. 5A is an illustration of a bottom view of an exemplary version of a scalable area gripper of the disclosure, having a structural frame in the form of a flat apparatus.

The material 40 has one or more boundaries 68 (see FIGS. 1, 5A), and the material 40, such as the ply 42, has one or more ply boundaries 70 (see FIGS. 1, 5A). The material 40, such as the ply 42, further has a plurality of sections 72 (see FIGS. 1, 5A), where each section 72 has control points 74 (see FIGS. 1, 5A), such as two control points 74, including a start portion 76 (see FIGS. 1, 5A), such as a start point 77 (see FIGS. 1, 5A), and an end portion (POR.) 78 (see FIGS. 1, 5A), such as an end point 79 (see FIGS. 1, 5A). For each section 72 there is a single start portion 76, or start point 77, and a single end portion 78, or end point 79. Further, each section 72 is identified to obtain an identified section (SECT.) 72*a* (see FIG. 1), has a span 82 (see FIG. 1) between the start portion 76, such as the start point 77, and the end portion 78, such as the end point 79. The one or more boundaries 68, such as the one or more ply boundaries 70, are determined, and adhesion area control 80 (see FIG. 1) of the material 40, such as the ply 42, to the scalable area gripper 10, is based on the one or more boundaries 68, such as the one or more ply boundaries 70. Adhesion area control 80 based on boundaries 68, such as ply boundaries 70, simplifies control.

The plurality of sections 72 of the material 40, such as the ply 42, are identified to obtain one or more identified sections 72*a* (see FIGS. 1, 5A), and for each identified section 72*a*, the start portion 76, such as the start point 77, and the end portion 78, such as the end point 79, are calculated and identified. Further, each section 72, such as each identified section 72*a*, of the material 40, such as the ply 42, has a span 82 (see FIGS. 1, 5A) between the start portion 76, such as the start point 77, and the end portion 78, such as the end point 79. Adhesion area control 80 based on boundaries 68, such as ply boundaries 70, simplifies control and avoids having to use discrete control along the length of each section 72.

After the one or more plies 42, such as the one or more cut plies 42*a*, are picked up by the robot 22 using the scalable area gripper 10, the one or more plies 42, such as the one or more cut plies 42*a*, may be placed on a tool or mold for layup and forming, to form a composite layup. The one or more plies 42, such as the one or more cut plies 42*a* may get vacuum bagged, infused with resin, and placed into an autoclave or oven to undergo a curing process, to form a composite laminate. The dry fabric rolls 44 or dry fabric sheets 46 may be preimpregnated or infused with a resin material, such as a resin binder, for example, a thermoset material or a thermoplastic material, prior to, or during, the curing process.

The composite laminate is used to form a composite part 294 (see FIG. 10), such as an aircraft composite part 296 (see FIG. 10), for example, a spar, such as a wing spar or another type of spar, a rib, a stiffening member, a stringer, a beam, or another suitable composite part. In one illustrative version, the composite part 294, such as the aircraft composite part 296, is used in the manufacture of a vehicle 280 (see FIG. 10), such as an aircraft 280*a* (see FIG. 10). The composite part 294 may also be made in the manufacture of vehicles 280, including rotorcraft, spacecraft, watercraft, automobiles, trucks, and other suitable vehicles, or in the manufacture of suitable structures.

As shown in FIG. 1, the automated material handling system 14 comprises the scalable area gripper system 12 having the scalable area gripper 10. The scalable area gripper 10 comprises a structural frame 84. The structural frame 84 (see FIGS. 1, 4, 5A) of the scalable area gripper 10 is configured for attachment to, and attaches to, for example, the end effector 26 (see FIG. 4) attached to the robot 22 (see FIGS. 1, 4). In one version, the structural frame 84 comprises a flat apparatus 86 (see FIGS. 1, 5A), such as a two-dimensional, generally flat or planar apparatus, having at least two sides 88 (see FIG. 5A). As shown in FIG. 5A, the structural frame 84 comprises four sides 88 that are coupled together to form a rectangular shape 90 or configuration.

Figure 4:
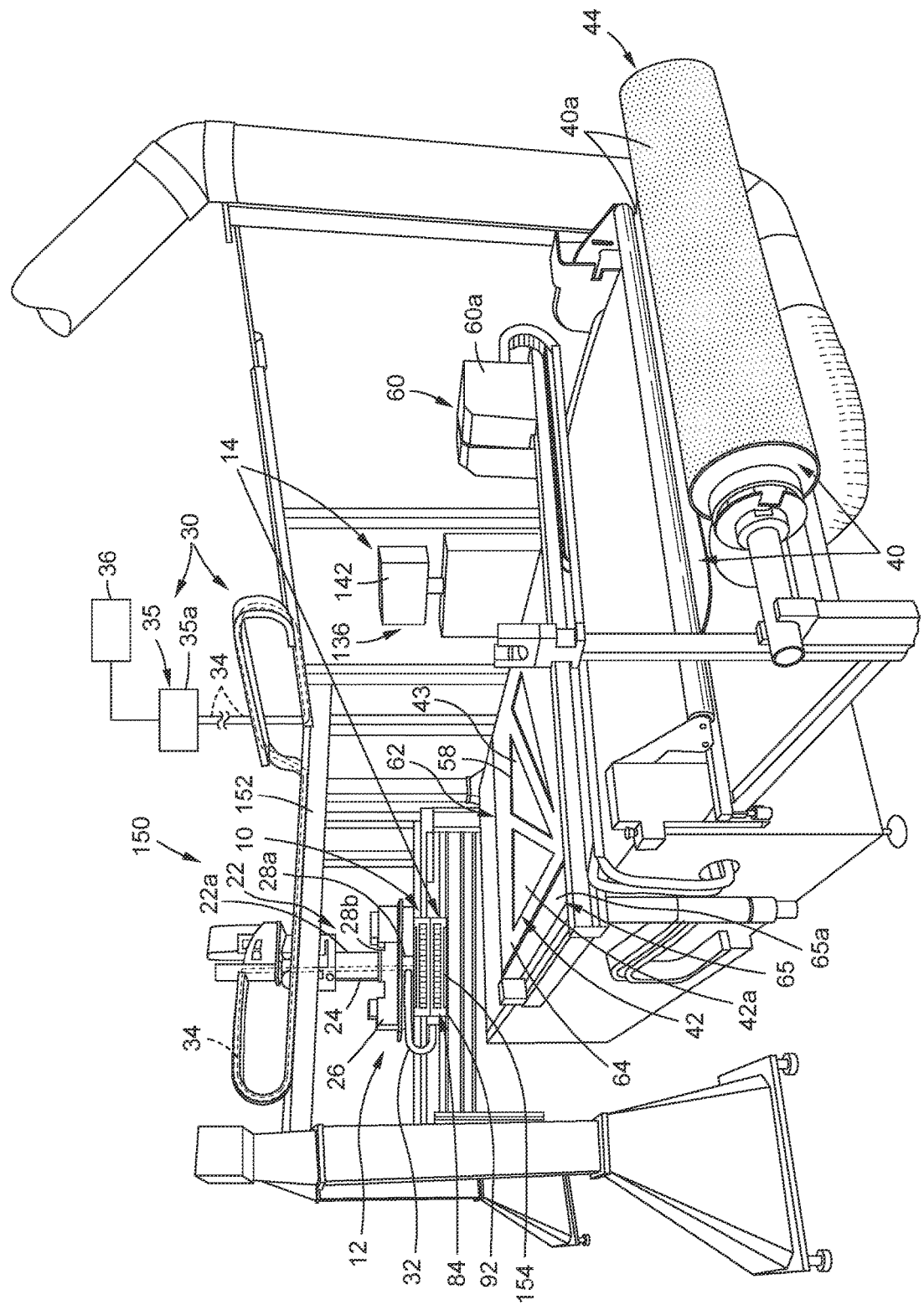
FIG. 4 is an illustration of a front perspective view of a production cell incorporating exemplary versions of an automated material handling system and a scalable area gripper system of the disclosure.
Figure 6A:
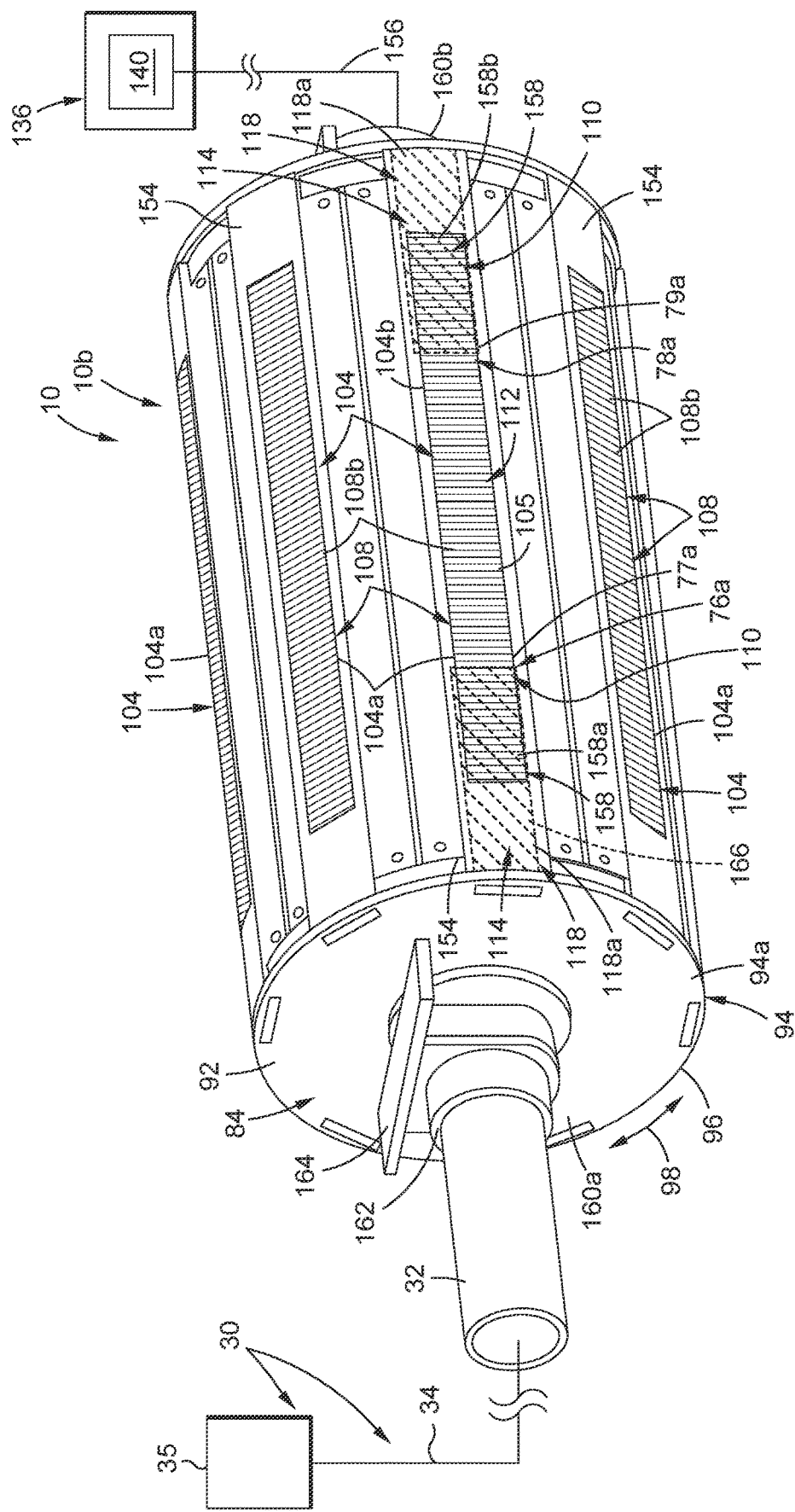
FIG. 6A is an illustration of a front perspective view of another exemplary version of a scalable area gripper of the disclosure, having a structural frame in the form of a roller apparatus attached to a vacuum system.

In another version, the structural frame 84 comprises a roller apparatus 92 (see FIGS. 1, 4, 6A). As shown in FIG. 6A, the roller apparatus 92 has a body 94 with a cylindrical shape 96 or configuration, and with a circumference 98. In yet another version, the structural frame 84 comprises a curved apparatus 100 (see FIG. 1), other than the roller apparatus 92, and comprises a three-dimensional apparatus with two or more curved sides 101 (see FIG. 1), where each curved side 101 has one or more curves 102 (see FIG. 1). The structural frame 84 may also comprise another suitably shaped apparatus.

As shown in FIG. 1, the scalable area gripper 10 further comprises a plurality of variable vacuum zones 104 (see also FIG. 5A). Each variable vacuum zone 104 has a length 106 (see FIGS. 1, 5A, 6B). The plurality of variable vacuum zones 104 are coupled to the structural frame 84. For the structural frame 84 in the form of the flat apparatus 86, as shown in FIG. 5A, the plurality of variable vacuum zones 104 are disposed across the flat apparatus 86. For the structural frame 84 in the form of the roller apparatus 92, as shown in FIG. 6A, the plurality of variable vacuum zones 104 are disposed circumferentially along the roller apparatus 92. For the structural frame 84 in the form of the curved apparatus 100, the plurality of variable vacuum zones 104 are disposed across the curved apparatus 100.

As further shown in FIG. 1, each variable vacuum zone 104 comprises a plurality of vacuum ports 108 (see also FIGS. 5A, 6A) or openings or orifices. Each vacuum port 108 is configured to go, or configured to be moved, between a closed state 110 (see FIGS. 1, 5A) and an open state 112 (see FIGS. 1, 5A).

Figure 5B:
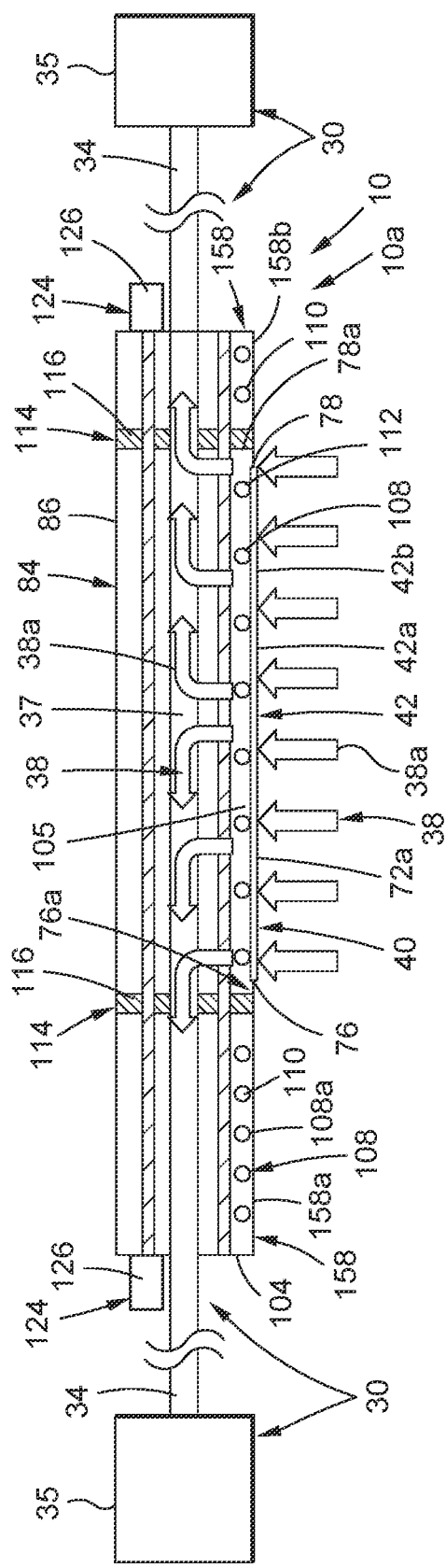
FIG. 5B is an illustration of an enlarged cross-section view of a portion of the scalable area gripper, taken along lines 5B-5B, of FIG. 5A.
Figure 6B:
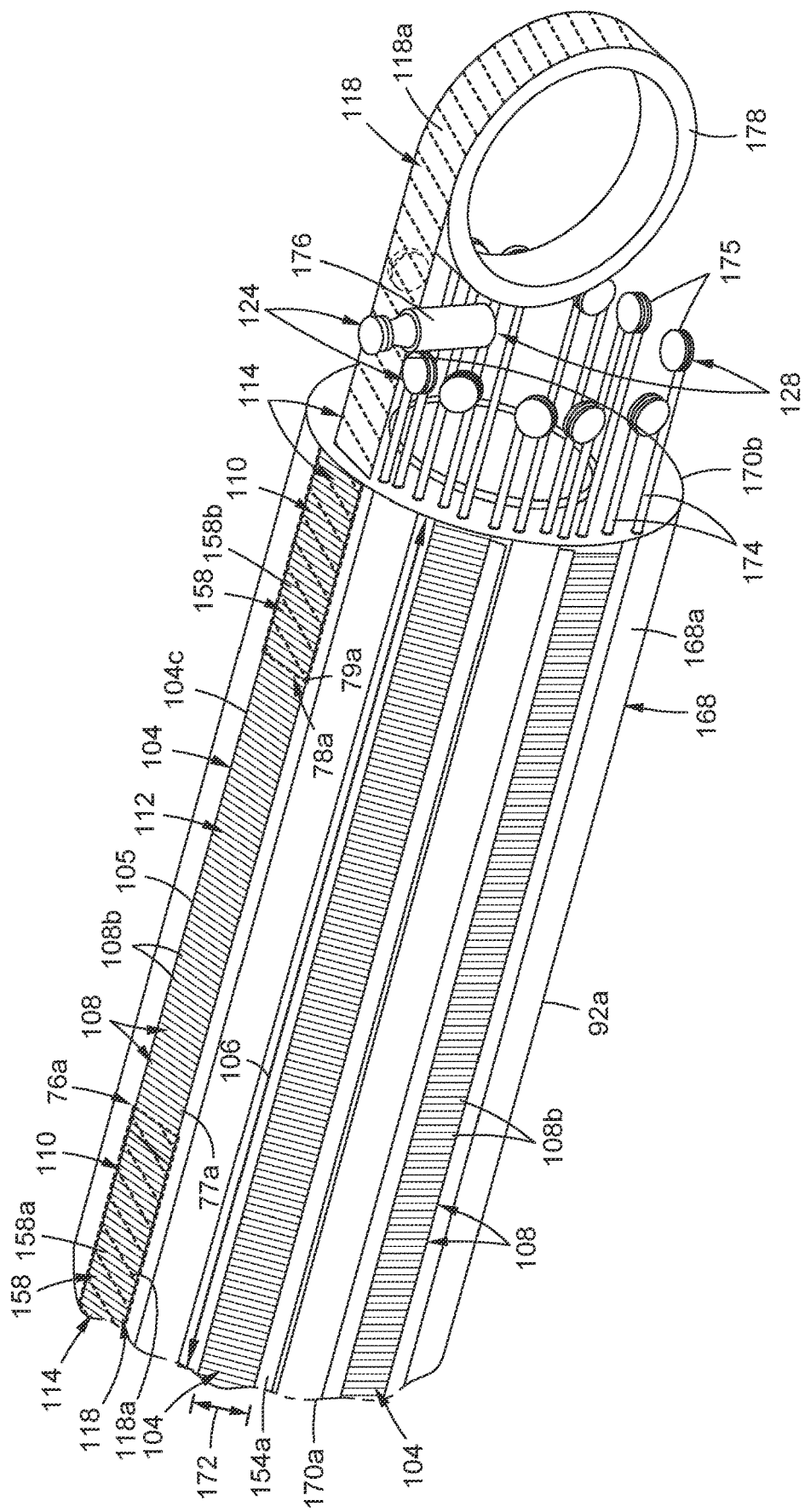
FIG. 6B is an illustration of a front perspective of an exemplary version of an interior portion of the scalable area gripper of FIG. 6A.

As shown in FIG. 1, each variable vacuum zone 104 further comprises one or more movable barrier elements 114 (see also FIGS. 5B, 6B). In one version, each of the one or more movable barrier elements 114 comprises a movable seal 116 (see FIGS. 1, 5B). The movable seal 116 (see FIG. 5B) may comprise a mechanical (MECH.) seal 116a (see FIGS. 1, 5B) comprising a flat elastomeric seal, a flat gasket seal, or another suitable flat seal element. The movable seal 116 is made of a flexible, durable, and resilient material, such as elastomer or rubber, a polymer material, synthetic rubber copolymer of acrylonitrile (ACN) and butadiene, nitrile butadiene rubber (NBR), silicone, silicone rubbers, neoprene, fluoroelastomers, or another suitable material. The movable seal 116 is designed to block off one or more vacuum ports 108 on each variable vacuum zone 104.

Figure 7A:
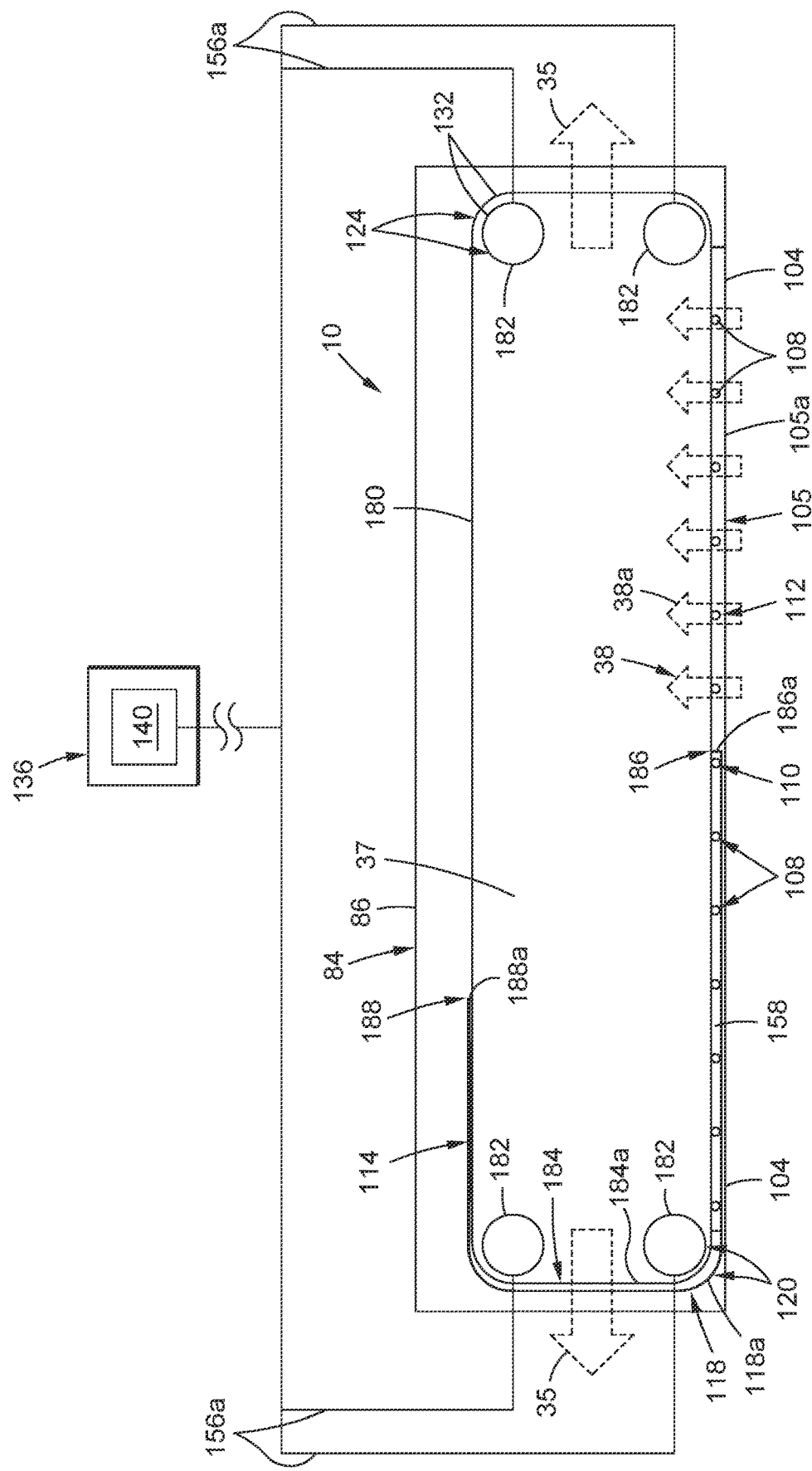
FIG. 7A is an illustration of a sectional side view of an exemplary version of a scalable area gripper of the disclosure, having a belt shield assembly.

In another version, discussed in further detail below with respect to FIGS. 7A-7B, each of the one or more movable barrier elements 114 comprises a mechanical (MECH.) shield 118 (see FIGS. 1, 7A-7B) or shielding, to block air flow 38a through one or more of the plurality of vacuum ports 108 (see FIGS. 7A-7B) of a selected variable vacuum zone 104 (see FIGS. 7A-7B). In one exemplary version, as shown in FIG. 7A, the mechanical shield 118 comprises a belt shield assembly (ASSY.) 120 (see also FIG. 1). In another version, discussed in further detail below, with respect to FIGS. 8A-8E, each of the one or more movable barrier elements 114 comprises a magnetic zipper seal assembly (ASSY.) 122 (see also FIG. 1).

As shown in FIG. 1, each variable vacuum zone 104 further comprises an actuator assembly 124 configured to move each of the one or more movable barrier elements 114 across one or more of the plurality of vacuum ports 108, to cause the one or more plurality of vacuum ports 108 to go between the closed state 110 and the open state 112. As shown in FIG. 1, the actuator assembly (ASSY.) 124 may comprise a rotary actuator assembly (ASSY.) 125, a linear actuator assembly (ASSY.) 126, or another suitable actuator assembly. As shown in FIG. 1, the linear actuator assembly 126 may comprise a motor driven pulley and cable actuator assembly (ASSY.) 128, a magnet drive assembly (ASSY.) 129, a rack and pinion actuator assembly (ASSY.) 130, a belt drive assembly (ASSY.) 132, a screw drive assembly (ASSY.) 134, or another suitable linear actuator assembly.

One or more of the plurality of variable vacuum zones 104 is configured to be adjusted, and is adjusted, to each provide an adjusted vacuum zone 105 (see FIGS. 1, 5A) that is aligned above and with, and corresponds to, the identified section 72a of the material 40, such as the ply 42, having the start portion 76, or start point 77, and the end portion 78, or end point 79. As shown in FIGS. 1, 5A, each adjusted vacuum zone 105 has control points 74a, including a start portion 76a, or start point 77a, and an end portion 78a, or end point 79a, and each adjusted vacuum zone 105 is configured to be positioned, and is positioned, adjacent to its corresponding identified section 72a of the material 40, such as the ply 42. Each adjusted vacuum zone 105 is configured to be activated, and is activated, to pick up the material 40, such as the ply 42, during the material handling process 16 (see FIG. 1) for composite manufacturing 18 (see FIG. 1). Each adjusted vacuum zone 105 has a span 107 (see FIGS. 1, 5C) between the start portion 76a and the end portion 78a.

Once the boundaries 68 of the material 40, such as the ply boundaries 70 of the ply 42, are determined, the start portion 76 and the end portion 78 of the material 40, such as the ply 42, are calculated, and the one or more movable barrier elements 114 are moved or driven, via the actuator assembly 124, to the respective start portion 76a and end portion 78a of the adjusted vacuum zone 105 adjacent the corresponding identified section 72a between the start portion 76 and the end portion 78 of the material 40, such as the ply 42.

As shown in FIG. 1, the scalable area gripper system 12 further comprises a control system 136 coupled to the scalable area gripper 10. As shown in FIG. 1, in one exemplary version, the control system 136 may comprise a position controller 138 configured to operably control positioning, and operably controls positioning, of the scalable area gripper 10 with respect to the material 40, such as the ply 42. As shown in FIG. 1, the control system 136 may further comprise an actuator assembly (ASSY.) controller 140 configured to operably control, and operably controls, the actuator assembly 124, to move each of the one or more movable barrier elements 114 across one or more of the plurality of vacuum ports 108 to go between the closed state 110 and the open state 112 of the vacuum ports 108.

As shown in FIG. 1, the control system 136 may further comprise a computer 142 configured to process, and processes, a software program 144. The software program 144 is configured to determine, and determines, the boundaries 68 of the material 40, such as the ply boundaries 70 of the ply 42, and to calculate the start portion 76 and the end portion 78, based on the boundaries 68 of the material 40, such as the ply boundaries 70 of the ply 42. The scalable area gripper system 12 controls material adhesion 146 (see FIG. 1), such as ply adhesion 148 (see FIG. 1), based on the boundaries 68, such as the ply boundaries 70. The control points 74 are set at the start portion 76 and the end portion 78 of the material 40, such as the ply 42, in one dimension, instead of using many individually controlled valves to switch a vacuum along the full length of a vacuum zone or area. The plurality of sections 72 of the material 40, such as the ply 42, are identified to obtain one or more identified sections 72a (see FIG. 1), and for each identified section 72a, the start portion 76, such as the start point 77, and the end portion 78, such as the end point 79, are calculated and identified. Further, each section 72, such as each identified section 72a, has a span 82 (see FIG. 1) between the start portion 76, such as the start point 77, and the end portion 78, such as the end point 79. Adhesion area control 80 based on boundaries 68, such as ply boundaries 70, simplifies control.

In another version, as shown in FIG. 1, an automated material handling system 14 for a material handling process 16 in composite manufacturing 18 is provided. The automated material handling system 14 comprises the material 40 (see FIG. 1), such as the ply 42 (see FIG. 1), to be picked up and removed from a work surface 65 (see FIG. 4). The automated material handling system 14 further comprises the robot 22 (see FIG. 1) with the end effector 26 (see FIG. 4). automated material handling system 14 further comprises the scalable area gripper system 12 (see FIG. 1), comprising the scalable area gripper 10 (see FIG. 1), discussed in detail above.

As discussed above, and shown in FIG. 1, the scalable area gripper 10 has the structural frame 84 and the plurality of variable vacuum zones 104 coupled to the structural frame 84. In one version, as shown in FIG. 5A, the structural frame 84 comprises a flat apparatus 86, and the plurality of variable vacuum zones 104 are disposed across the flat apparatus 86. In another version, as shown in FIG. 6A, the structural frame 84 comprises the roller apparatus 92, and the plurality of variable vacuum zones 104 are disposed circumferentially along the roller apparatus 92. In yet another version, the structural frame 84 comprises the curved apparatus 100 (see FIG. 1), other than the roller apparatus 92, and comprises a three-dimensional apparatus with two or more curved sides 101 (see FIG. 1), where each curved side 101 has one or more curves 102 (see FIG. 1). The structural frame 84 may also comprise another suitably shaped apparatus.

Each variable vacuum zone 104 comprises a plurality of vacuum ports 108 (see FIG. 1). Each variable vacuum zone 104 further comprises one or more movable barrier elements 114 (see FIG. 1). Each of the one or more movable barrier elements 114 comprises one of, a movable seal 116 (see FIGS. 1, 5B), such as a mechanical seal 116a (see FIGS. 1, 5B), a magnetic zipper seal assembly 122 (see FIG. 8A), a mechanical shield 118 (see FIG. 7A), including a belt shield assembly 120 (see FIG. 7A), or another suitable movable barrier element.

Each variable vacuum zone 104 further comprises the actuator assembly 124 (see FIG. 1) configured to move each of the one or more movable barrier elements 114 across one or more of the plurality of vacuum ports 108, to cause the one or more plurality of vacuum ports 108 to go between the closed state 110 (see FIG. 1) and the open state 112 (see FIG. 1). As shown in FIG. 1, the actuator assembly 124 may comprise the rotary actuator assembly 125, the linear actuator assembly 126, or another suitable actuator assembly. As shown in FIG. 1, the linear actuator assembly 126 may comprise the motor driven pulley and cable actuator assembly 128, the magnet drive assembly 129, the rack and pinion actuator assembly 130, the belt drive assembly 132, the screw drive assembly 134, or another suitable linear actuator assembly.

The scalable area gripper system 12 of the automated material handling system 14 further comprises the control system 136 (see FIG. 1) coupled to the scalable area gripper 10. As discussed above, in one version, the control system 136 comprises the position controller 138 (see FIG. 1) configured to operably control positioning, and operably controls positioning, of the scalable area gripper 10 with respect to the material 40, such as the ply 42. The control system 136 further comprises the actuator assembly controller 140 (see FIG. 1) configured to operably control, and operably controls, the actuator assembly 124, to move each of the one or more movable barrier elements 114 across one or more of the plurality of vacuum ports 108. The control system 136 further comprises a computer 142 (see FIG. 1) configured to process, and processes, a software program 144 (see FIG. 1). The software program 144 is configured to determine, and determines, boundaries 68 of the material 40, such as ply boundaries 70 of the ply 42, and to calculate the start portion 76 and the end portion 78, based on the boundaries 68 of the material 40, such as the ply boundaries 70 of the ply 42.

The automated material handling system 14 further comprises the vacuum system 30 (see FIG. 1) coupled to the scalable area gripper 10. The vacuum system 30 has the vacuum source 35 to provide air 38 (see FIG. 1), such as air flow 38a (see FIG. 1), through the one or more plurality of vacuum ports 108 in the open state 112.

The scalable area gripper system 12 is configured to adjust, and adjusts, one or more of the plurality of variable vacuum zones 104, to each provide an adjusted vacuum zone 105 (see FIG. 1) that corresponds to a corresponding identified section 72a (see FIG. 1) of the material 40, such as the ply 42, having the start portion 76 (see FIG. 1), such as the start point 77 (see FIG. 1), and the end portion 78 (see FIG. 1), such as the end point 79 (see FIG. 1). The scalable area gripper system 12 is configured to position, and positions, each adjusted vacuum zone 105 adjacent to its corresponding identified section 72a of the material 40, such as the ply 42, and is configured to activate, and activates, the adjusted vacuum zone 105, to pick up and remove the material 40, such as the ply, from the work surface 65 during the material handling process 16 in the composite manufacturing 18.

Now referring to FIG. 2, FIG. 2 is an illustration of a front perspective view of an exemplary version of material 40, such as fiber material 48, having fibers 50, such as unidirectional fibers 50a, stitched together with threads 52, to form a stitched unidirectional fabric 54, that may be used with a version of the scalable area gripper system 12 (see FIG. 1) discussed above, and picked up with a version of the scalable area gripper 10 (see FIG. 1) discussed above. The material 40, such as the fiber material 48 comprises dry fabric sheets 46 to form plies 42 (see FIG. 1). The fibers 50 may be made from natural and/or man-made materials such as carbon, fiberglass, graphite, and the like. The material 40, such as the fiber material 48 has stiffness in a fiber direction 55 (see FIG. 2) but has a low bending stiffness, or no stiffness, in a non-fiber direction 56 (see FIG. 2).

Now referring to FIG. 3, FIG. 3 is an illustration of a side perspective view of an exemplary version of a dry fabric roll 44 of material 40, such as composite material 40a, for example, raw composite material 40b, showing plies 42, such as cut plies 42a, cut into net shapes 58 of various geometric configurations with edges 66, and arranged in a ply nest 62. FIG. 3 further shows waste material 64, such as portions 64a of waste material 64, also referred to as skeleton material or scrap material, adjacent the plies 42, such as the cut plies 42a. The plies 42, such as the cut plies 42a, are cut and nested from the dry fabric roll 44 and are cut with a cutter apparatus 60 (see FIG. 4), such as an automated cross-cutter apparatus 60a (see FIG. 4), or another suitable cutter apparatus. The plies 42, such as the cut plies 42a, are configured to be picked up and placed by the robot 22 (see FIG. 4) using the scalable area gripper 10, and are configured to be separated from the remaining material, such as the remaining composite material, comprising the waste material 64, or skeleton material, that is not picked up. The plies 42, such as the cut plies 42a, that are selectively picked up from, for example, the work surface 65

(see FIG. 4) by the robot 22 using the scalable area gripper 10, may be laid directly on a tool or mold for laying up, or on a carrier apparatus, a mobile apparatus, or another suitable apparatus for forming or transport.

Now referring to FIG. 4, FIG. 4 is an illustration of a front perspective view of a production cell 150 for performing the material handling process 16 (see FIG. 1) for composite manufacturing 18 (see FIG. 1), where the production cell 150 incorporates exemplary versions of the automated material handling system 14 and the scalable area gripper system 12 of the disclosure, as discussed above.

As shown in FIG. 4, the production cell 150 includes a dry fabric roll 44 of material 40, such as composite material 40a, for example, carbon fabric, from which plies 42, such as cut plies 42a, are cut. As shown in FIG. 4, the production cell 150 further includes the cutter apparatus 60, such as the automated cross-cutter apparatus 60a, for cutting plies 42, such as the cut plies 42a, from the dry fabric roll 44, into net shapes 58 of various geometric configurations and arranged in the ply nest 62. The production cell 150 further includes the work surface 65 (see FIG. 4), such as the conveyor belt 65a, from which the plies 42, such as the cut plies 42a, in the ply nest 62 are moved after being cut with the cutter apparatus 60, such as the automated cross-cutter apparatus 60a.

As shown in FIG. 4, the production cell 150 further includes the automated material handling system 14 comprising the robot 22, such as the pick-and-place operations robot 22a, and the vacuum system 30. As shown in FIG. 4, the robot 22, such as the pick-and-place operations robot 22a, includes the arm 24 with the end effector 26. The scalable area gripper 10 (see FIG. 4) of the scalable area gripper system 12 (see FIG. 4), is coupled to the first end 28a (see FIG. 4) of the end effector 26, and the second end 28b (see FIG. 4) of the end effector 26 is coupled to the arm 24 of the robot 22. The scalable area gripper 10 is held by the robot 22, via the end effector 26. As shown in FIG. 4, the end effector 26 is mounted to a gantry 152. The gantry 152 is configured to move, and moves, the end effector 26 of the robot 22 over the one or more plies 42, such as one or more cut plies 42a, to be picked up, and lowers the end effector 26 with the attached scalable area gripper 10, so that one or more surfaces 154 (see FIG. 4) of the scalable area gripper 10 are in contact with a surface 43 (see FIG. 4) of each of the one or more plies 42, such as the one or more cut plies 42a, to be picked up from the work surface 65, and removed from the waste material 64 (see FIG. 4), or skeleton material.

As shown in FIG. 4, the vacuum system 30 has the vacuum manifold 32 coupled to the scalable area gripper 10, and the vacuum manifold 32 is coupled to the vacuum source 35, via a vacuum line 34. The vacuum manifold 32 distributes air 38 (see FIG. 1) from the vacuum line 34 to the entire end effector 26. In one version, the vacuum manifold 32 is part of the end effector 26. In another version, the vacuum manifold 32 is coupled to the arm 24, prior to the end effector 26. The vacuum power supply 36 (see FIG. 4) is coupled to the vacuum source 35. The vacuum source 35 comprises a vacuum generator 35a (see FIG. 4). However, the vacuum source 35 may comprise a blower or another suitable vacuum source. The vacuum system 30 is configured to pull air 38 (see FIG. 1) in an air flow 38a (see FIG. 1), or vacuum flow, through the scalable area gripper 10 to pick up, and adhere or secure, the desired plies 42, such as cut plies 42a, to one or more surfaces 154 (see FIG. 4) of the scalable area gripper 10.

The automated material handling system 14 and the scalable area gripper system 12 of the production cell 150 may be operated by an operator using the control system 136 (see FIG. 4) for operatively controlling operations of the automated material handling system 14 and the scalable area gripper system 12, and other components of the production cell 150, including coordinating and controlling movements of the dry fabric roll 44, the cutter apparatus 60, such as the automated cross-cutter apparatus 60a, the work surface 65, such as the conveyor belt 65a, the vacuum system 30, the gantry 152, and the end effector 26 with the attached scalable area gripper 10. As shown in FIG. 4, the control system 136 comprises a computer 142. The computer 142 may comprise a portable computer (PC), a programmable logic controller (PLC), or another suitable computer. In one version, the computer 142 uses a software program 144 (see FIG. 1), which may include an algorithm or logic, that determines how the material handling process 16 should progress and the sequential operation of the components of the production cell 150.

Now referring to FIGS. 5A-5E, FIGS. 5A-5E show exemplary versions of a scalable area gripper 10, such as in the form of a scalable area gripper 10a, having a structural frame 84 in the form of a flat apparatus 86 with a rectangular shape 90 and with sides 88, such as sides 88a, 88b, 88c, and 88d. FIG. 5A is an illustration of a bottom view of an exemplary version of the scalable area gripper 10, such as in the form of scalable area gripper 10a, having the structural frame 84 in the form of the flat apparatus 86, and gripping a material 40, such as a ply 42, for example, a cut ply 42a. The scalable area gripper 10 is part of the scalable area gripper system 12 (see FIG. 5A), which also includes the control system 136 (see FIG. 5A). As shown in FIG. 5A, a ply 42, such as a cut ply 42a, for example, a first ply 42b, is gripped and picked up with the scalable area gripper 10, such as the scalable area gripper 10a. As shown in FIG. 5A, other plies 42, such as cut plies 42a, are left on a work surface 65, such as a cutting table 65b. FIG. 5A further shows portions 64a of waste material 64 adjacent the plies 42, such as the cut plies 42a. As shown in FIG. 5A, the first ply 42b has a plurality of sections 72. One or more of the plurality of sections 72 are identified to obtain one or more identified sections 72a (see FIG. 5A), each having a span 82 (see FIG. 5A) between the start portion 76, such as the start point 77, and the end portion 78, such as the end point 79.

As shown in FIG. 5A, the scalable area gripper 10, such as in the form of scalable area gripper 10a, comprises a plurality of variable vacuum zones 104 coupled to sides 88, such as sides 88a, 88b, across the structural frame 84. Each variable vacuum zone 104 has a length 106 (see FIG. 5A). Each variable vacuum zone 104 comprises a plurality of vacuum ports 108 (see FIG. 5A), such as circular vacuum ports 108a. The vacuum ports 108 may also be another suitable shape. Each variable vacuum zone 104 is coupled to movable barrier elements 114 (see FIG. 5A), such as a movable seals 116 (see FIG. 5A), for example, two (2) movable seals 116.

Each variable vacuum zone further comprises an actuator assembly 124 (see FIG. 5A), such as a linear actuator assembly 126 (see FIG. 5A), coupled to the movable barrier elements 114, such as the movable seals 116. The actuator assembly 124, such as the linear actuator assembly 126, is configured to move each movable barrier element 114 across one or more of the plurality of vacuum ports 108, to cause the one or more plurality of vacuum ports 108 to go between the closed state 110 (see FIG. 5A) and the open state 112 (see FIG. 5A). As shown in FIG. 5A, each actuator assembly 124, such as the linear actuator assembly 126, is coupled, via connection elements 156, such as wired connection elements or wireless connection elements, to the actuator assembly controller 140 of the control system 136. The actuator assembly controller 140 is configured to operably control, and operably controls, the actuator assembly 124, such as the linear actuator assembly 126, to move the movable barrier elements 114, such as the movable seals 116, across one or more of the plurality of vacuum ports 108.

As shown in FIG. 5A, the variable vacuum zones 104 each have an adjusted vacuum zone 105 having a start portion 76a, such as a start point 77a, and having an end portion 78a, such as an end point 79a. Each adjusted vacuum zone 105 has vacuum ports 108 in the open state 112 (see FIG. 5A). As shown in FIG. 5A, each variable vacuum zone 104 is adjusted to have an adjusted vacuum zone 105 that corresponds to a corresponding identified section 72a of the first ply 42b having the start portion 76 and the end portion 78. Each adjusted vacuum zone 105 is configured to be positioned adjacent to its corresponding identified section 72a of the first ply 42b, and is configured to be activated to pick up the first ply 42b.

As further shown in FIG. 5A, the variable vacuum zones 104 each have one or more inactive vacuum zones 158, including a first inactive vacuum zone 158a and a second inactive vacuum zone 158b, both blocked by the movable barrier elements 114, such as the movable seals 116, which block the vacuum ports 108 of the inactive vacuum zones 158. The vacuum ports 108 of the inactive vacuum zones 158, including the first inactive vacuum zone 158a and the second inactive vacuum zone 158b, of each variable vacuum zone 104, are in the closed state 110 (see FIG. 5A).

The scalable area gripper 10, such as in the form of scalable area gripper 10a, is coupled to a vacuum system 30 (see FIGS. 1, 4, 5B), and in particular, the variable vacuum zones 104 are coupled to a vacuum chamber 37 (see FIG. 5B), which is coupled to a vacuum source 35 (see FIG. 5B), via vacuum lines 34 (see FIG. 5B).

FIG. 5B is an illustration of an enlarged cross-section view of a portion of the scalable area gripper 10, such as in the form of scalable area gripper 10a, taken along lines 5B-5B, of FIG. 5A. FIG. 5B shows material 40, such as a ply 42, for example, a cut ply 42a, in the form of first ply 42b, gripped by the scalable area gripper 10, such as in the form of scalable area gripper 10a. FIG. 5B shows the structural frame 84, such as the flat apparatus 86, the variable vacuum zone 104 with the plurality of vacuum ports 108, such as circular vacuum ports 108a, the movable barrier elements 114, such as the movable seals 116, the actuator assembly 124, such as the linear actuator assembly 126, coupled to the movable barrier elements 114, such as the movable seals 116, and the vacuum system 30 coupled to the scalable area gripper 10, such as in the form of scalable area gripper 10a. As shown in FIG. 5B, the scalable area gripper 10, such as in the form of scalable area gripper 10a, is coupled to a vacuum system 30, and in particular, the variable vacuum zone 104 is coupled to a vacuum chamber 37, which is coupled to a vacuum source 35, via vacuum lines 34.

FIG. 5B shows the variable vacuum zone 104 adjusted to have the adjusted vacuum zone 105 that corresponds to a corresponding identified section 72a of the ply 42 having the start portion 76 and the end portion 78. The adjusted vacuum zone 105 is positioned adjacent to its corresponding identified section 72a of the first ply 42b, and is configured to be activated to pick up the first ply 42b. As shown in FIG. 5B, the adjusted vacuum zone 105 has the start portion 76a and the end portion 78a. The adjusted vacuum zone 105 has vacuum ports 108 in the open state 112 (see FIG. 5B). As shown in FIG. 5B, air 38, such as air flow 38a, flows through the vacuum ports 108, in the open state 112, and into the vacuum chamber 37.

As further shown in FIG. 5B, the variable vacuum zone 104 has inactive vacuum zones 158, including the first inactive vacuum zone 158a and the second inactive vacuum zone 158b, blocked by the movable barrier elements 114, such as the movable seals 116, which block the vacuum ports 108 of the inactive vacuum zones 158. The vacuum ports 108 of the inactive vacuum zones 158, including the first inactive vacuum zone 158a and the second inactive vacuum zone 158b, of the variable vacuum zone 104, are in the closed state 110 (see FIG. 5B).

Figure 5C:
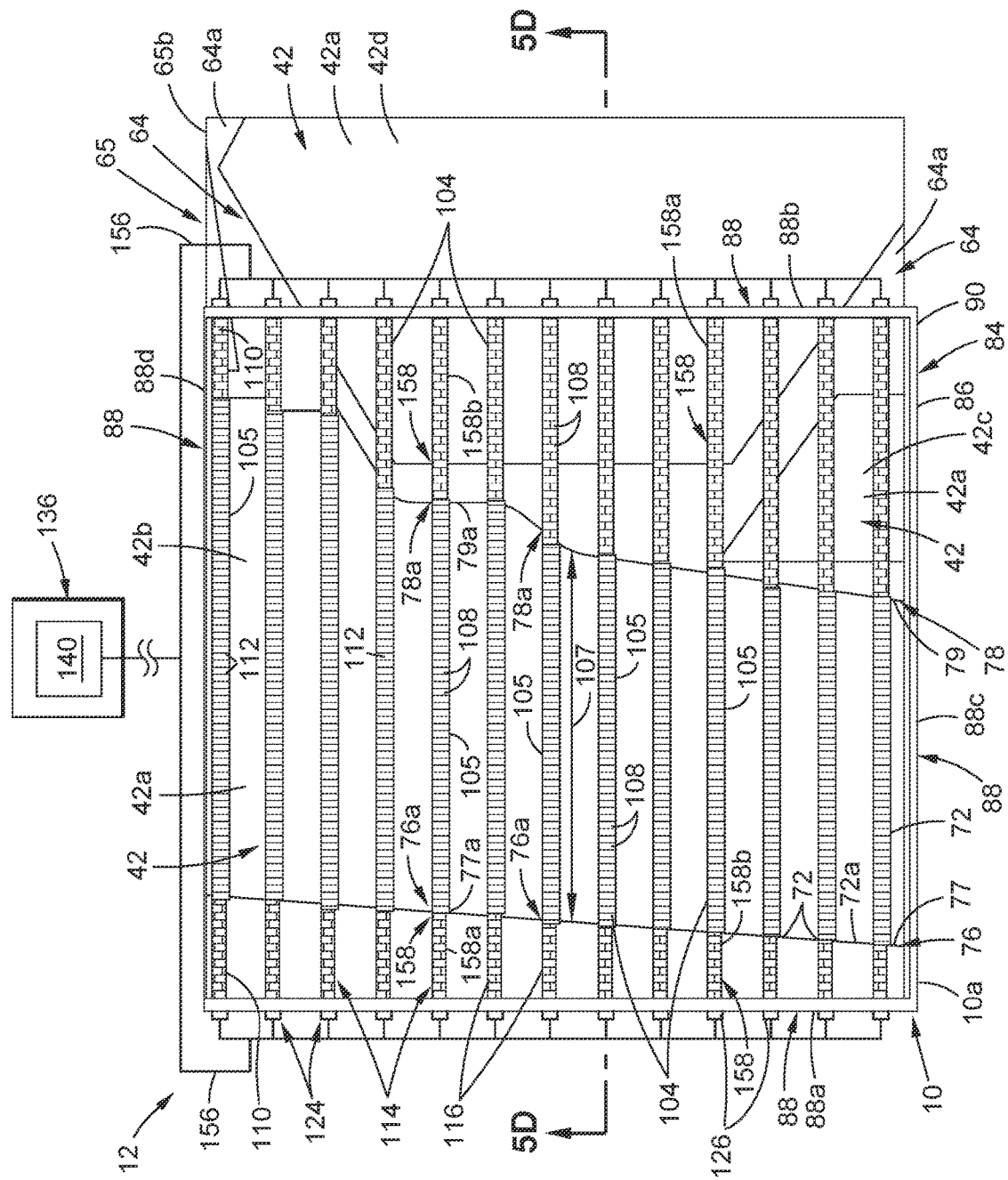
FIG. 5C is an illustration of a top view of an exemplary version of a scalable area gripper of the disclosure, having a structural frame in the form of a flat apparatus.

FIG. 5C is an illustration of a top view of an exemplary version of a scalable area gripper system 12 having a scalable area gripper 10, such as in the form of scalable area gripper 10a, of the disclosure, coupled to a control system 136. As shown in FIG. 5C, the scalable area gripper 10, such as in the form of scalable area gripper 10a, has a structural frame 84 in the form of a flat apparatus 86 with sides 88 and having a rectangular shape 90. FIG. 5C shows plies 42, such as cut plies 42a, and portions 64a of waste material 64, between the plies 42, such as the cut plies 42a, on a work surface 65, such as a cutting table 65b. FIG. 5C shows a ply 42, such as a cut ply 42a, comprising a first ply 42b, to be picked up with the scalable area gripper 10, such as the scalable area gripper 10a. As shown in FIG. 5C, the first ply 42b has a plurality of sections 72. Each section 72 has a start portion 76, such as a start point 77, and an end portion 78, such as an end point 79. FIG. 5C further shows a ply 42, such as a cut ply 42a, comprising a second ply 42c, to be left on the work surface 65, such as the cutting table 65b. FIG. 5C further shows a ply 42, such as a cut ply 42a, comprising a third ply 42d, to be left on the work surface 65, such as the cutting table 65b.

As shown in FIG. 5C, the scalable area gripper 10, such as in the form of scalable area gripper 10a, comprises the plurality of variable vacuum zones 104 coupled to sides 88, such as sides 88a, 88b, across the structural frame 84. Each variable vacuum zone 104 comprises the plurality of vacuum ports 108 and is coupled to movable barrier elements 114, such as movable seals 116, which are actuated, or moved, by an actuator assembly 124, such as a linear actuator assembly 126, configured to move the movable barrier elements 114 across one or more of the plurality of vacuum ports 108, to cause the one or more plurality of vacuum ports 108 to go between the closed state 110 and the open state 112. As shown in FIG. 5C, each variable vacuum zone 104 is adjusted to have an adjusted vacuum zone 105 that corresponds to a corresponding identified section 72a of the first ply 42b having the start portion 76 and the end portion 78. Each adjusted vacuum zone 105 is configured to be positioned adjacent to its corresponding identified section 72a of the first ply 42b, and is configured to be activated to pick up the first ply 42b.

As shown in FIG. 5C, the variable vacuum zones 104 each have an adjusted vacuum zone 105 having a start portion 76a, such as a start point 77a, and having an end portion 78a, such as an end point 79a. Each adjusted vacuum zone 105 has a span 107 between the start portion 76a and the end portion 78a. Each adjusted vacuum zone 105 has vacuum ports 108 in the open state 112 (see FIG. 5C). As further shown in FIG. 5C, the variable vacuum zones 104 each have inactive vacuum zones 158, including the first inactive vacuum zone 158a and the second inactive vacuum zone 158b, both blocked or covered by the movable barrier elements 114, such as the movable seals 116, which block or cover the vacuum ports 108 of the inactive vacuum zones 158. The vacuum ports 108 of the inactive vacuum zones 158, including the first inactive vacuum zone 158*a* and the second inactive vacuum zone 158*b*, of each variable vacuum zone 104, are in the closed state 110 (see FIG. 5C).

Figure 5E:
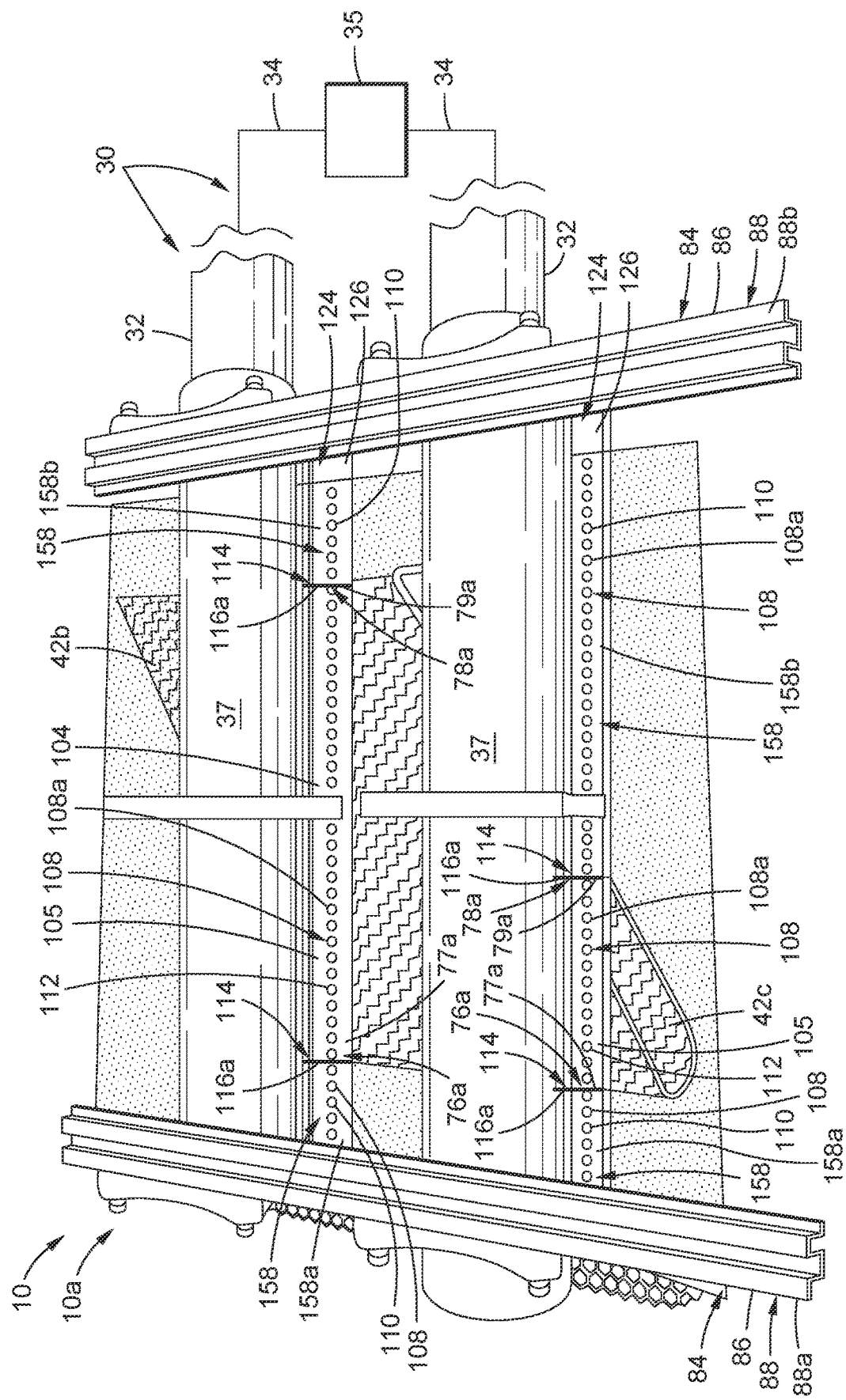
FIG. 5E is an illustration of a top view of an exemplary version of a scalable area gripper having a structural frame in the form of a flat apparatus attached to a vacuum system.

The scalable area gripper 10, such as in the form of scalable area gripper 10*a*, is coupled to a vacuum system 30 (see FIGS. 1, 4, 5E). In particular, the variable vacuum zones 104 are coupled to one or more vacuum chambers 37 (see FIG. 5E), which are coupled to a vacuum manifold 32 (see FIG. 5E), and the vacuum manifold 32 is coupled to vacuum lines 34 (see FIG. 5E) connected to a vacuum source 35 (see FIG. 5E).

FIG. 5D is an illustration of a cross-section view of plies 42, such as cut plies 42*a*, and waste material 64, taken along lines 5D-5D of FIG. 5C. FIG. 5D shows portions 64*a* of waste material 64 adjacent a ply 42, such as a cut ply 42*a*, comprising the first ply 42*b*, and adjacent a ply 42, such as a cut ply 42*a*, comprising the third ply 42*d*. The first ply 42*b* is to be picked up with the scalable area gripper 10 (see FIG. 5C), such as the scalable area gripper 10*a* (see FIG. 5C). The third ply 42*d* is to be left on the work surface 65 (see FIG. 5D), such as the cutting table 65*b* (see FIG. 5D).

FIG. 5E is an illustration of a top view of an exemplary version of a scalable area gripper 10, such as in the form of scalable area gripper 10*a*, having the structural frame 84 in the form of the flat apparatus 86 and attached to the vacuum system 30. FIG. 5E shows the structural frame 84, such as the flat apparatus 86, having two (2) sides 88*a*, 88*b*. Vacuum chambers 37 (see FIG. 5E) and variable vacuum zones 104 (see FIG. 5E) are coupled between the sides 88*a*, 88*b*, of the structural frame 84. The vacuum system 30 comprises the vacuum chambers 37 coupled to the vacuum manifold 32, and the vacuum manifold 32 is coupled to vacuum lines 34 connected to the vacuum source 35. Each variable vacuum zone 104 has the plurality of vacuum ports 108 (see FIG. 5E), such as in the form of circular vacuum ports 108*a*, that are configured to be moved between the closed state 110 and the open state 112. The vacuum ports 108 may also be another suitable shape.

As shown in FIG. 5E, the variable vacuum zones 104 each have an adjusted vacuum zone 105 having the start portion 76*a*, such as the start point 77*a*, and having the end portion 78*a*, such as the end point 79*a*. The adjusted vacuum zone 105 has vacuum ports 108 in the open state 112. As further shown in FIG. 5E, the variable vacuum zones 104 each have inactive vacuum zones 158, including the first inactive vacuum zone 158*a* and the second inactive vacuum zone 158*b*, both blocked or covered by movable barrier elements 114, such as mechanical seals 116*a*, which block or cover the vacuum ports 108 of the inactive vacuum zones 158. The vacuum ports 108 of the inactive vacuum zones 158, including the first inactive vacuum zone 158*a* and the second inactive vacuum zone 158*b*, are in the closed state 110.

FIG. 5E further shows the scalable area gripper 10, such as in the form of scalable area gripper 10*a*, gripping a first ply 42*b* and a second ply 42*c*. FIG. 5E further comprises the actuator assembly 124, such as a linear actuator assembly 126, coupled to the movable barrier elements 114, such as the mechanical seals 116*a*.

Now referring to FIG. 6A, FIG. 6A is an illustration of a front perspective view of another exemplary version of a scalable area gripper 10, such as in the form of a scalable area gripper 10*b*, of the disclosure, having a structural frame 84 in the form of a roller apparatus 92, attached to a vacuum system 30, via a vacuum line 34. As shown in FIG. 6A, the roller apparatus 92 has a body 94, such as a cylinder body 94*a*, having a circumference 98 and a cylindrical shape 96. The roller apparatus 92 has a first end 160*a* (see FIG. 6A) and a second end 160*b* (see FIG. 6A). As shown in FIG. 6A, the first end 160*a* has an opening 162 attached to a vacuum manifold 32, and the vacuum manifold 32 is attached to the vacuum line 34 connected to the vacuum system 30 having a vacuum source 35. The first end 160*a* further has an attachment member 164 for attachment to an end effector 26 (see FIG. 4) of a robot 22 (see FIG. 4).

As shown in FIG. 6A, the scalable area gripper 10, such as in the form of the scalable area gripper 10*b*, comprises a portion 104*a* of the plurality of variable vacuum zones 104 disposed circumferentially along the surface 154 of the roller apparatus 92. Each variable vacuum zone 104 has the plurality of vacuum ports 108 (see FIG. 6A). As shown in FIG. 6A, the plurality of vacuum ports 108 comprise slot vacuum ports 108*b* that are configured to be moved between the closed state 110 and the open state 112. As further shown in FIG. 6A, one of the variable vacuum zones 104, such as a select variable vacuum zone 104*b*, has an adjusted vacuum zone 105 having a start portion 76*a*, such as a start point 77*a*, and having an end portion 78*a*, such as an end point 79*a*. The adjusted vacuum zone 105 has vacuum ports 108 in the open state 112. As further shown in FIG. 6A, the select variable vacuum zone 104*a* has inactive vacuum zones 158, including the first inactive vacuum zone 158*a* and the second inactive vacuum zone 158*b*, both blocked or covered by movable barrier elements 114, such as mechanical shields 118, for example, mechanical shield seals 118*a*, which block or cover the vacuum ports 108 of the inactive vacuum zones 158 from an interior 166 of the roller apparatus 92. The vacuum ports 108 of the inactive vacuum zones 158, including the first inactive vacuum zone 158*a* and the second inactive vacuum zone 158*b*, are in the closed state 110.

As shown in FIG. 6A, the roller apparatus 92 is coupled, via a connection element 156, such as a wired connection element or a wireless connection element, to the actuator assembly controller 140 of the control system 136. The actuator assembly controller 140 is configured to operably control the actuator assembly 124 (see FIG. 6B), such as a motor driven pulley and cable actuator assembly 128 (see FIG. 6B), to move the movable barrier elements 114, such as the mechanical shields 118, for example, the mechanical shield seals 118*a*, across one or more of the plurality of vacuum ports 108.

Now referring to FIG. 6B, FIG. 6B is an illustration of a front perspective of an exemplary version of an interior roller apparatus portion 92*a* of the scalable area gripper 10, such as the scalable area gripper 10*b*, of FIG. 6A. As shown in FIG. 6B, the interior roller apparatus portion 92*a* has a body 168, such as a cylinder body 168*a*. The interior roller apparatus portion 92*a* has a first end 170*a* (see FIG. 6B) that corresponds to the first end 160*a* (see FIG. 6A) of the roller apparatus 92, and the interior roller apparatus portion 92*a* has a second end 170*b* (see FIG. 6B) that corresponds to the second end 160*b* (see FIG. 6A) of the roller apparatus 92 (see FIG. 6A). As shown in FIG. 6B, the a plurality of variable vacuum zones 104 are disposed circumferentially along a surface 154*a* of the interior roller apparatus portion 92*a* of the roller apparatus 92 (see FIG. 6A). Each variable vacuum zone 104 has a length 106 (see FIG. 6B) and a width 172 (see FIG. 6B), and a plurality of vacuum ports 108 (see FIG. 6A) comprising slot vacuum ports 108*b* configured to be moved between the closed state 110 (see FIG. 6B) and the open state 112 (see FIG. 6B).

As further shown in FIG. 6B, one of the variable vacuum zones 104, such as a select variable vacuum zone 104*c*, has an adjusted vacuum zone 105 having a start portion 76a, such as a start point 77a, and having an end portion 78a, such as an end point 79a. The adjusted vacuum zone 105 has vacuum ports 108 in the open state 112. As further shown in FIG. 6B, the variable vacuum zone 104a has inactive vacuum zones 158, including the first inactive vacuum zone 158a and the second inactive vacuum zone 158b, both blocked or covered by the movable barrier elements 114, such as the mechanical shields 118, for example, the mechanical shield seals 118a, which block or cover the vacuum ports 108 of the inactive vacuum zones 158. The vacuum ports 108 of the inactive vacuum zones 158, including the first inactive vacuum zone 158a and the second inactive vacuum zone 158b, are in the closed state 110.

As shown in FIG. 6B, the actuator assembly 124, in the form of the motor driven pulley and cable actuator assembly 128, is coupled to the second end 170b of the interior roller apparatus portion 92a of the roller apparatus 92 (see FIG. 6A). The actuator assembly 124, in the form of the motor driven pulley and cable actuator assembly 128, is configured to drive, or move, the movable barrier elements 114, such as the mechanical shields 118, for example, the mechanical shield seals 118a, across one or more of the plurality of vacuum ports 108, of the variable vacuum zone 104. As shown in FIG. 6B, the motor driven pulley and cable actuator assembly 128 comprises a plurality of cables 174 coupled to a plurality of pulleys 175, and a motor 176 configured to drive, or move, the plurality of cables 174 and the plurality of pulleys 175, which, in turn, drive, or move, the movable barrier elements 114, such as the mechanical shields 118, for example, the mechanical shield seals 118a, across one or more of the plurality of vacuum ports 108, of the variable vacuum zone 104. FIG. 6B further shows the movable barrier element 114, such as the mechanical shield 118, for example, the mechanical shield seal 118a, in the form of a roll dispenser 178, for dispensing the movable barrier element 114, such as the mechanical shield 118, for example, the mechanical shield seal 118a, when actuated by the actuator assembly 124, in the form of the motor driven pulley and cable actuator assembly 128.

Now referring to FIG. 7A, FIG. 7A is an illustration of a sectional side view of an exemplary version of a scalable area gripper 10 of the disclosure, having a belt shield assembly 120. FIG. 7A shows, in one version, the scalable area gripper 10 having the structural frame 84, such as in the form of the flat apparatus 86, and having the variable vacuum zone 104 with the plurality of vacuum ports 108. In another version, the scalable area gripper 10 has the structural frame 84, such as in the form of the roller apparatus 92.

As shown in FIG. 7A, the belt shield assembly 120 comprises a movable barrier element 114, such as in the form of a mechanical shield 118, for example, a mechanical shield seal 118a. As further shown in FIG. 7A, the belt shield assembly 120 comprise an actuator assembly 124, such as a belt drive assembly 132. The belt drive assembly 132 comprises a belt 180 (see FIG. 7A) that is moved, or driven, with a plurality of belt rollers 182 (see FIG. 7A) that guide the movable barrier element 114, such as in the form of the mechanical shield 118, for example, a mechanical shield seal 118a, around a portion 184a of a perimeter 184 of the belt 180. As shown in FIG. 7A, the plurality of belt rollers 182 comprise four (4) belt rollers 182. However, the number of belt rollers 182 may comprise one (1), two (2), three (3), or more than four (4) belt rollers 182. The belt rollers 182 are configured to move the belt 180 and guide the movable barrier element 114, such as in the form of a mechanical shield 118, for example, the mechanical shield seal 118a, around the portion 184a of the perimeter 184 of the belt 180. The mechanical shield 118, such as the mechanical shield seal 118a, is coupled to the belt 180. The belt drive assembly 132 with the belt rollers 182 and the belt 180 is configured to move, and moves, the mechanical shield 118, such as the mechanical shield seal 118a, to block or cover, or unblock and uncover, one or more vacuum ports 108, to cause the vacuum ports 108 to go between the open state 112 and the closed state 110. As shown in FIG. 7A, the plurality of belt rollers 182 are coupled, via connection elements 156a, such as wired connection elements or wireless connection elements, to the actuator assembly controller 140 of the control system 136. The actuator assembly controller 140 is configured to operably control the actuator assembly 124, such as the belt drive assembly 132, to move the movable barrier elements 114, such as the mechanical shield 118, for example, the mechanical shield seal 118a across one or more of the plurality of vacuum ports 108.

As shown in FIG. 7A, the scalable area gripper 10 has a vacuum chamber 37 coupled to a vacuum source 35 that supplies air 38, such as air flow 38a, through vacuum ports 108 in the open state 112. FIG. 7A shows the adjusted vacuum zone 105, such as an adjusted active vacuum zone 105a, of the variable vacuum zone 104, with the vacuum ports 108 in the open state 112 to allow the air 38, such as the air flow 38a, to flow through the vacuum ports 108 in the adjusted active vacuum zone 105a and into the vacuum chamber 37. FIG. 7A further shows the inactive vacuum zone 158, of the variable vacuum zone 104, with the vacuum ports 108 in the closed state 110 and blocked or covered by the mechanical shield 118, such as the mechanical shield seal 118a, to block the air 38, such as the air flow 38a, from flowing through the vacuum ports 108 in the inactive vacuum zone 158. As shown in FIG. 7A, the mechanical shield 118, such as the mechanical shield seal 118a, has a first end 186, such as a starting point 186a, and a second end 188, such as an ending point 188a. The first end 186, such as the starting point 186a, starts the inactive vacuum zone 158, and the mechanical shield 118, such as the mechanical shield seal 118a, blocks or covers the vacuum ports 108 in the inactive vacuum zone 158.

Figure 7B:
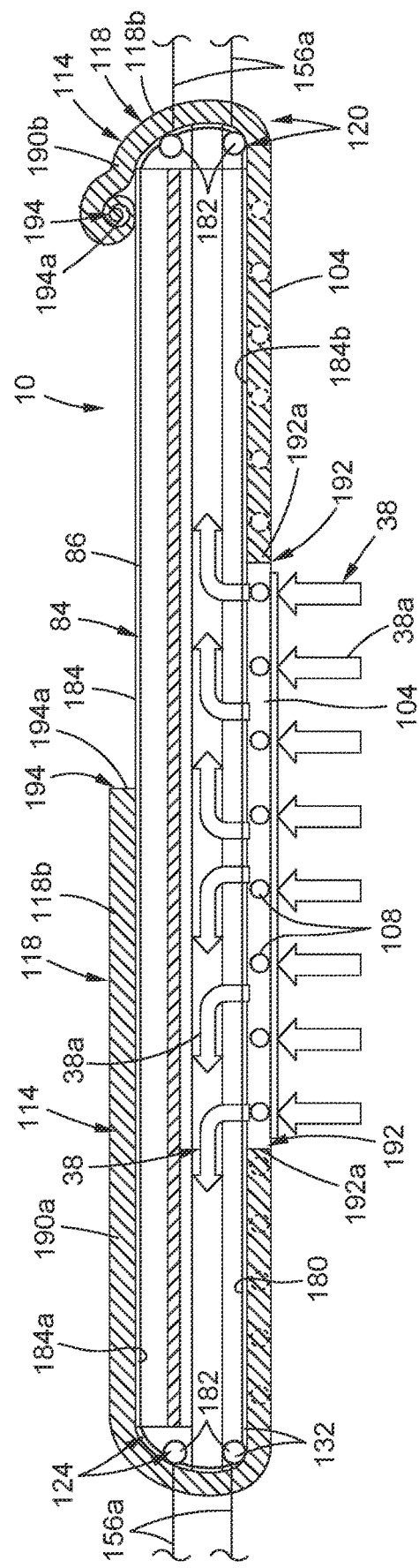
FIG. 7B is an illustration of a sectional side view of an exemplary version of a scalable area gripper of the disclosure, having a belt shield assembly with a retractable mechanical shield seal.

Now referring to FIG. 7B, FIG. 7B is an illustration of a sectional side view of an exemplary version of a scalable area gripper 10 of the disclosure, having a belt shield assembly 120 with movable barrier elements 114 in the form of mechanical shields 118, such as retractable mechanical shield seals 118b. The mechanical shields 118, such as the retractable mechanical shield seals 118b, are driven or moved with the actuator assembly 124, such as the belt drive assembly 132. FIG. 7B shows, in one version, the scalable area gripper 10 having the structural frame 84, such as in the form of the flat apparatus 86, and having the variable vacuum zone 104 with the plurality of vacuum ports 108. In another version, the scalable area gripper 10 has the structural frame 84, such as in the form of the roller apparatus 92.

As shown in FIG. 7B, the belt shield assembly 120 comprises the movable barrier elements 114, such as in the form of the mechanical shields 118, for example, the retractable mechanical shield seals 118b. As further shown in FIG. 7B, the belt shield assembly 120 comprise the actuator assembly 124, such as the belt drive assembly 132. The belt drive assembly 132 comprises the belt 180 (see FIG. 7B) that is moved, or driven, with the plurality of belt rollers 182 (see FIG. 7B) to guide the movable barrier elements 114, such as in the form of the mechanical shields 118, for example, the retractable mechanical shield seals 118b, around portions 184a, 184b, of the perimeter 184 of the belt

180. As shown in FIG. 7B, the plurality of belt rollers 182 comprise four (4) belt rollers 182. However, the number of belt rollers 182 may comprise one (1), two (2), three (3), or more than four (4) belt rollers 182.

As shown in FIG. 7B, a first portion 190*a* of the mechanical shields 118, such as the retractable mechanical shield seals 118*b*, is coupled to the belt 180, and a second portion 190*b* of the mechanical shields 118, such as the retractable mechanical shield seals 118*b*, is coupled to the belt 180. The belt drive assembly 132 with the belt rollers 182 and the belt 180 is configured to move, and moves, the first portion 190*a* and the second portion 190*b* of the mechanical shields 118, such as the retractable mechanical shield seals 118*b*, across, and away from or over, one or more vacuum ports 108, to cause the vacuum ports 108 to go between the open state 112 and the closed state 110. The plurality of belt rollers 182 are coupled, via connection elements 156*a*, such as wired connection elements or wireless connection elements, to the actuator assembly controller 140 (see FIG. 7A) of the control system 136 (see FIG. 7A). The actuator assembly controller 140 is configured to operably control the actuator assembly 124, such as the belt drive assembly 132, to move the movable barrier elements 114, such as the mechanical shield 118, for example, the retractable mechanical shield seal 118*b* across one or more of the plurality of vacuum ports 108.

As shown in FIG. 7B, the scalable area gripper 10 has a vacuum chamber 37 coupled to a vacuum source 35 (see FIG. 7A) that supplies air 38, such as air flow 38*a*, through vacuum ports 108 in the open state 112. FIG. 7B shows the adjusted vacuum zone 105, such as the adjusted active vacuum zone 105*a*, of the variable vacuum zone 104, with the vacuum ports 108 in the open state 112 to allow the air 38, such as the air flow 38*a*, to flow through the vacuum ports 108 in the adjusted active vacuum zone 105*a*, and into the vacuum chamber 37. FIG. 7B further shows the inactive vacuum zones 158, including the first inactive vacuum zone 158*a* and the second inactive vacuum zone 158*b*, of the variable vacuum zone 104, with the vacuum ports 108 in the closed state 110 and blocked or covered, respectively, by the first portion 190*a* and the second portion 190*b* of the mechanical shields 118, such as the retractable mechanical shield seals 118*b*, to block the air 38, such as the air flow 38*a*, from flowing through the vacuum ports 108 in the inactive vacuum zones 158.

As shown in FIG. 7B, both the first portion 190*a* and the second portion 190*b* of the mechanical shields 118, such as the retractable mechanical shield seals 118*b*, have a first end 192, such as a starting point 192*a*, and a second end 194, such as an ending point 194*a*. With the first portion 190*a*, the first end 192, such as the starting point 192*a*, starts the first inactive vacuum zone 158*a*, and the first portion 190*a* of the mechanical shield 118, such as the retractable mechanical shield seal 118*b*, blocks or covers the vacuum ports 108 in the first inactive vacuum zone 158*a*. With the second portion 190*b*, the first end 192, such as the starting point 192*a*, starts the second inactive vacuum zone 158*b*, and the second portion 190*b* of the mechanical shield 118, such as the retractable mechanical shield seal 118*b*, blocks or covers the vacuum ports 108 in the second inactive vacuum zone 158*b*. As shown in FIG. 7B, the second portion 190*b* is retracted, or wound up, at the second end 194.

Figure 8A:
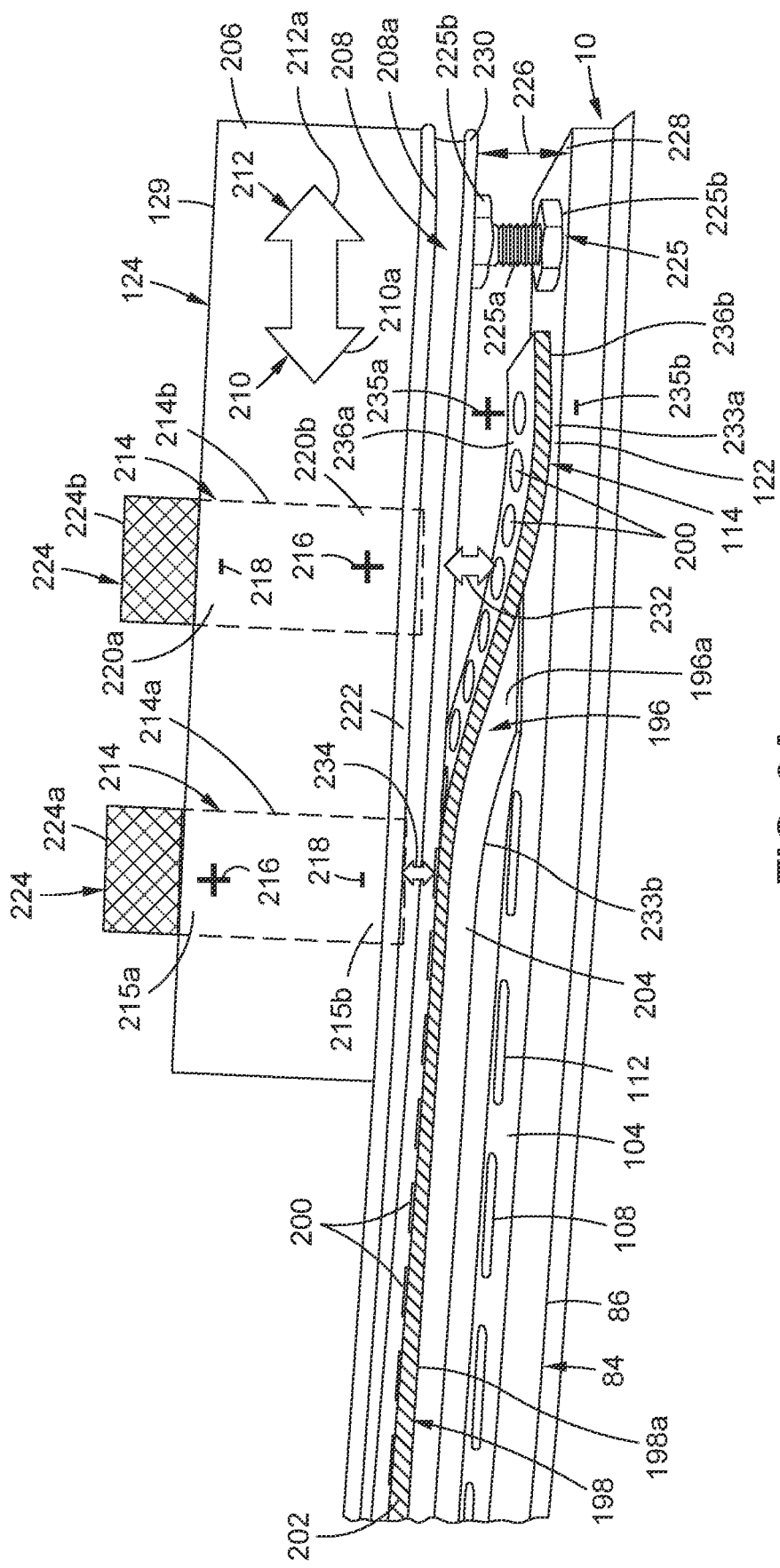
FIG. 8A is an illustration of a perspective side view of a movable barrier element in the form of a magnetic zipper seal assembly used with an exemplary version of a scalable area gripper.

Now referring to FIG. 8A, FIG. 8A is an illustration of a perspective side view of a movable barrier element 114 in the form of a magnetic zipper seal assembly 122 used with an exemplary version of a scalable area gripper 10. As shown in FIG. 8A, in this version, the magnetic zipper seal assembly 122 has an open/close mechanism 196 in the form of a single-sided external magnet open/close mechanism 196*a*. As shown in FIG. 8A, in this version, the magnetic zipper seal assembly 122 comprises a magnetic seal 198, such as in the form of a magnetic zipper seal 198*a*, having a plurality of seal magnets 200, incorporated into the magnetic seal 198, such as the magnetic zipper seal 198*a*. As shown in FIG. 8A, the magnetic seal 198 is in the form of a flexible strip 202 with the seal magnets 200 embedded in the flexible strip 202. However, the magnetic seal 198 may be in another suitable form or structure.

As shown in FIG. 8A, the magnetic zipper seal assembly 122 further comprises a flexible film portion 204 coupled to the magnetic seal 198, such as in the form of the flexible strip 202. The flexible strip 202 and the flexible film portion 204 are each comprised of one or more polymer materials, such as thermoplastic, thermoplastic polyurethane, thermoplastic rubber, thermoplastic elastomer, polycarbonate, polyvinylchloride, polyethylene, polyamide, elastomer, rubber, or another suitable polymer material. Each seal magnet 200 comprises a magnetic material, such as neodymium (Nd), neodymium iron boron (NdFeB), samarium cobalt (SmCo), alnico, ferrite, or another suitable magnetic material.

As shown in FIG. 8A, the movable barrier element 114 in the form of the magnetic zipper seal assembly 122 is actuated with an actuator assembly 124 comprising a magnetic drive assembly 129. As shown in FIG. 8A, the magnetic drive assembly 129 comprises a movable carriage device 206 configured to travel along, and travels along, one or more elongated members 208, such as one or more rails 208*a*, in a first direction 210, or forward direction 210*a*, and configured to travel along the one or more elongated members 208, such as the one or more rails 208*a*, in a second direction 212, or a back direction 212*a*. Each elongated member 208, such as the rail 208*a*, is made of a ferrous material, such as iron, steel, an alloy of iron or steel, or another suitable ferrous material.

As shown in FIG. 8A, the magnetic drive assembly 129 further comprises one or more control magnets 214 coupled to the movable carriage device 206. The movable carriage device 206 is configured to carry and move, and carries and moves, the control magnets 214 along the one or elongated members 208, such as the one or more rails 208*a*. FIG. 8A shows two control magnets 214. The two control magnets 214, comprise a first control magnet 214*a* (see FIG. 8A) and a second control magnet 214*b* (see FIG. 8A). As shown in FIG. 8A, the first control magnet 214*a* has a first end 215*a* with a positive pole 216 and a second end 215*b* with a negative pole 218. As further shown in FIG. 8A, the second control magnet 214*b* has a first end 220*a* with a negative pole 218 and a second end 220*b* with a positive pole 216. As shown in FIG. 8A, the control magnets 214 are positioned on a same side 222 and in sequence, and are positioned external to the magnetic zipper seal assembly 122.

Each control magnet 214 is secured, or held, in position with a holding magnet 224 (see FIG. 8A). As shown in FIG. 8A, a first holding magnet 224*a* is positioned on top of the first control magnet 214*a*, and holds the first control magnet 214*a* in position or place in the movable carriage device 206. As further shown in FIG. 8A, a second holding magnet 224*b* is positioned on top of the second control magnet 214*b*, and holds the second control magnet 214*b* in position or place in the movable carriage device 206. In other versions, the control magnets 214, such as the first control magnet 214*a* and the second control magnet 214*b*, can be held with another suitable holding apparatus or holding mechanism. Each control magnet 214 and each holding magnet 224 comprises a magnetic material, such as neodymium (Nd), neodymium iron boron (NdFeB), samarium cobalt (SmCo), alnico, ferrite, or another suitable magnetic material.

FIG. 8A further shows the scalable area gripper 10 with the structural frame 84, such as in the form of the flat apparatus 86, and with the variable vacuum zone 104 having the plurality of vacuum ports 108. As further shown in FIG. 8A, the scalable area gripper 10 is coupled to the one or more elongated members 208, such as the one or more rails 208a, with one or more attachment elements 225, such as in the form of a threaded bolt screw 225a and nuts 225b. The one or more attachment elements 225 may also comprise bolts, rivets, screws, or other suitable attachment elements. FIG. 8A shows a distance 226 between a top surface 228 of the scalable area gripper 10 and a bottom surface 230 of the elongated member 208, such as the rail 208a. An opening distance of the magnetic zipper seal assembly 122 is the distance 226 minus a thickness of the magnetic zipper seal assembly 122 (the flexible film portion 204 coupled to the magnetic seal 198). For the external magnet switching method, where the control magnets 214 are positioned external to the magnetic zipper seal assembly 122, as shown in FIGS. 8A-8D, the opening distance is preferably in a range of 2 mm (two millimeters) to 8 mm (eight millimeters). For the switching mechanism internal to the rails 208a, where, as shown in FIG. 8E, the control magnets 214 are positioned internal to the magnetic zipper seal assembly 122, or where, as shown in FIG. 8F, non-ferrous elements 242 are positioned internal to the magnetic zipper seal assembly 122, the opening distance is preferably in a range of 4 mm (four millimeters) to 15 mm (fifteen millimeters).

As shown in FIG. 8A, the control magnets 214 are both positioned on the same side 222 and along an upper side 236a of the magnetic zipper seal assembly 122, and the scalable area gripper is positioned along a lower side 236b of the magnetic zipper seal assembly 122. In particular, the magnetic zipper seal assembly 122 is positioned under, or below, the one or more elongated members 208, such as the one or more rails 208a, supporting the magnetic drive assembly 129, and is positioned on top of, or above, the vacuum ports 108 of the variable vacuum zone 104 of the scalable area gripper 10.

Figure 8B:
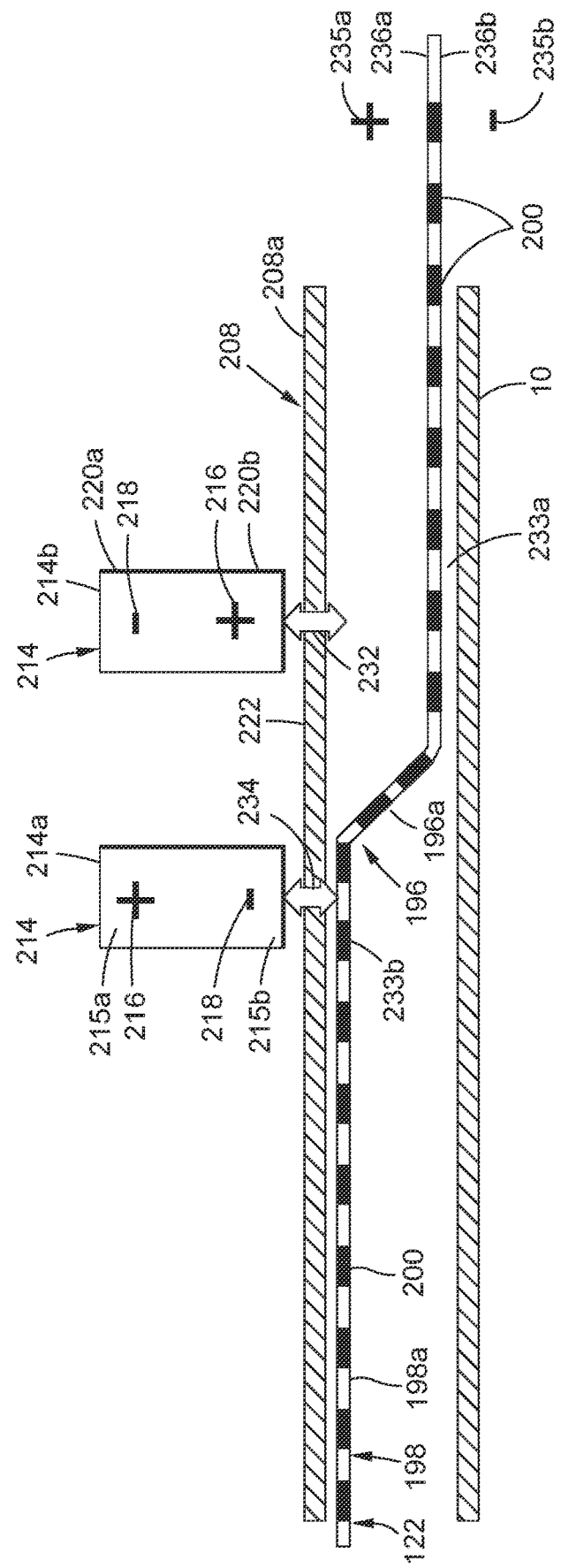
FIG. 8B is a schematic illustration of a side view of the magnetic zipper seal assembly of FIG. 8A, having a single-sided external magnet open/close mechanism.

As the movable carriage device 206 travels along the one or more elongated members 208, such as the one or more rails 208a, in the first direction 210, or forward direction 210a, magnetic repulsion forces 232 (see FIGS. 8A-8B) from the second control magnet 214b to the seal magnets 200 in the magnetic seal 198 cause the magnetic seal 198 and the flexible film portion 204 to move downwardly over one or more vacuum ports 108, to cause the one or more vacuum ports 108 to be in the closed state 110 (see FIG. 1) and to cause the magnetic zipper seal assembly 122 to be in a sealed state 233a (see FIGS. 8A-8B). As the movable carriage device travels along the one or more elongated members 208, such as the one or more rails 208b, in the second direction 212, or back direction 212a, magnetic attraction forces 234 (see FIGS. 8A-8B) from the first control magnet 214a to the seal magnets 200 in the magnetic seal 198 cause the magnetic seal 198 and the flexible film portion 204 to move upwardly over one or more vacuum ports 108, to cause the one or more vacuum ports 108 to be in the open state 112 (see FIG. 8A) and to cause the magnetic zipper seal assembly 122 to be in an unsealed state 233b (see FIGS. 8A-8B). With the open/close mechanism 196 in the form of the single-sided external magnet open/close mechanism 196a, the opening and closing of the magnetic zipper seal assembly 122 uses the magnetic attraction forces 234 and the magnetic repulsion forces 232 from the separate control magnets 214 located on the same side 222 (see FIGS. 8A-8B) and located external to the magnetic zipper seal assembly 122. As further shown in FIGS. 8A-8B, with the open/close mechanism 196 in the form of the single-sided external magnet open/close mechanism 196a, the magnetic zipper seal assembly 122 has a positive polarity 235a on the upper side 236a of the magnetic zipper seal assembly 122 and a negative polarity 235b on the lower side 236b of the magnetic zipper seal assembly 122.

Now referring to FIG. 8B, FIG. 8B is a schematic illustration of a side view of the magnetic zipper seal assembly 122 of FIG. 8A, having the open/close mechanism 196 in the form of the single-sided external magnet open/close mechanism 196a. FIG. 8B shows the magnetic zipper seal assembly 122 comprising the magnetic seal 198, such as in the form of the magnetic zipper seal 198a, with the seal magnets 200. The magnetic zipper seal assembly 122 has the positive polarity 235a on the upper side 236a and the negative polarity 235b on the lower side 236b. FIG. 8B further shows the control magnets 214, such as the first control magnet 214a and the second control magnet 214b, and the elongated member 208, such as the rail 208a, made of the ferrous material, such as iron, steel, an alloy of iron or steel, or another suitable ferrous material. As shown in FIG. 8B, the first control magnet 214a has the first end 215a with the positive pole 216 and the second end 215b with the negative pole 218. As further shown in FIG. 8B, the second control magnet 214b has the first end 220a with the negative pole 218 and the second end 220b with the positive pole 216.

As shown in FIG. 8B, the first control magnet 214a has magnetic attraction forces 234 to the seal magnets 200 in the magnetic zipper seal assembly 122, and causes the magnetic zipper seal assembly 122 to be in the unsealed state 233b. As further shown in FIG. 8B, the second control magnet 214b has magnetic repulsion forces 232 to the seal magnets 200 in the magnetic zipper seal assembly 122, and causes the magnetic zipper seal assembly 122 to be in the sealed state 233a. As shown in FIG. 8B, the magnetic zipper seal assembly 122 is positioned between the control magnets 214, which are both positioned on the same side 222, and the scalable area gripper 10. With the open/close mechanism 196 in the form of the single-sided external magnet open/close mechanism 196a, the opening and closing of the magnetic zipper seal assembly 122 uses the magnetic attraction forces 234 (see FIG. 8B) and the magnetic repulsion forces 232 (see FIG. 8B) from the separate control magnets 214 located on the same side 222 (see FIG. 8B) and located external to the magnetic zipper seal assembly 122.

Figure 8C:
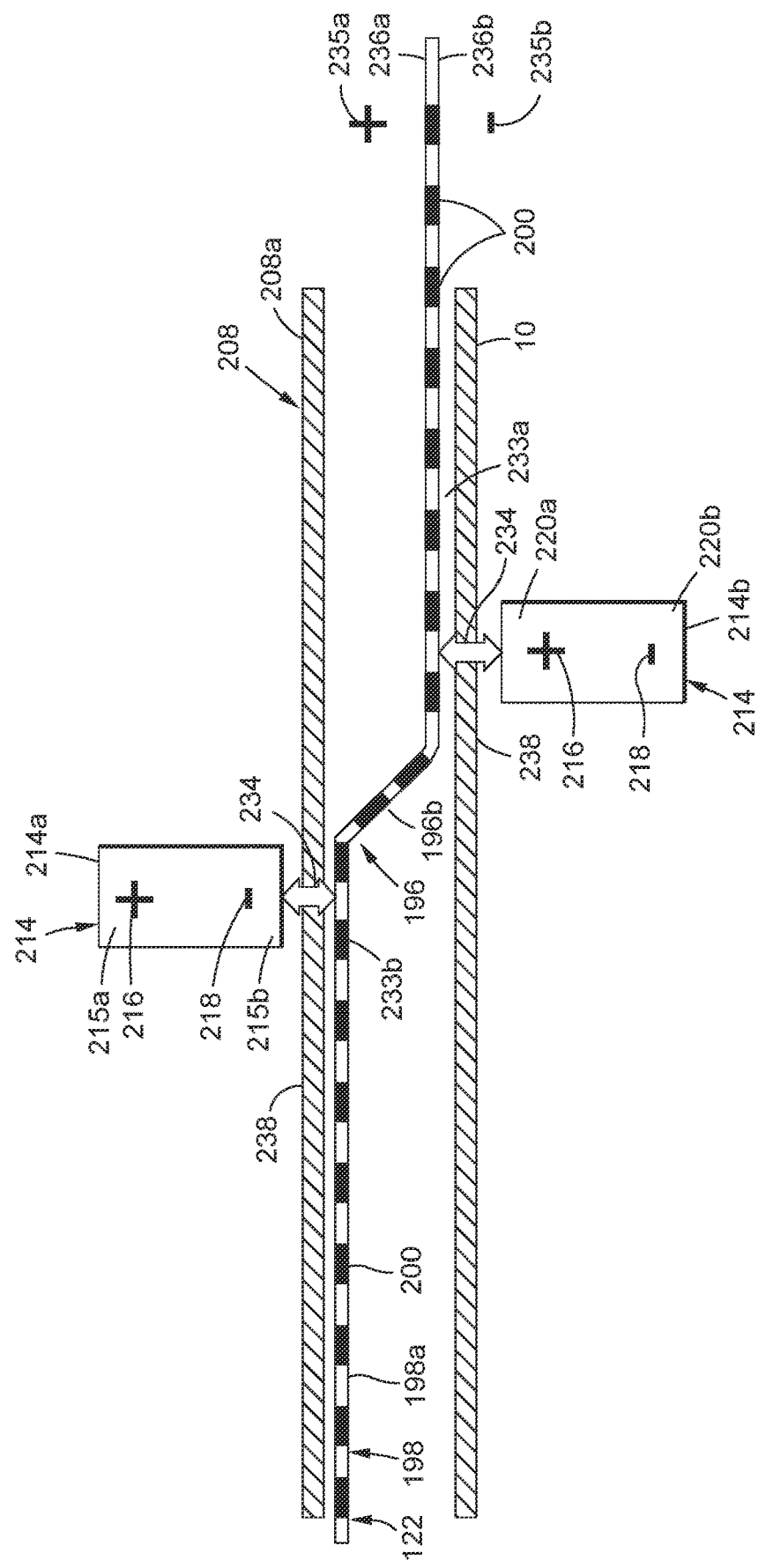
FIG. 8C is a schematic illustration of a side view of a magnetic zipper seal assembly having a two-sided external magnet attraction open/close mechanism.

Now referring to FIG. 8C, FIG. 8C is a schematic illustration of a side view of a magnetic zipper seal assembly 122 having the open/close mechanism 196 in the form of a two-sided external magnet attraction open/close mechanism 196b for opening and closing the magnetic zipper seal assembly 122. FIG. 8C shows the magnetic zipper seal assembly 122 comprising the magnetic seal 198, such as in the form of the magnetic zipper seal 198a, with the seal magnets 200. The magnetic zipper seal assembly 122 has the positive polarity 235a on the upper side 236a and the negative polarity 235b on the lower side 236b.

FIG. 8C further shows the control magnets 214, such as the first control magnet 214a and the second control magnet 214b on opposite sides 238 of the magnetic zipper seal assembly 122. The first control magnet 214a is positioned on the elongated member 208, such as the rail 208a, made of the ferrous material, and is positioned above, and external to, the magnetic zipper seal assembly 122. The second control magnet 214b is positioned below the scalable area gripper 10, and is positioned below, and external to, the magnetic zipper seal assembly 122. As shown in FIG. 8C, the first control magnet 214a has the first end 215a with the positive pole 216 and the second end 215b with the negative pole 218, and the first control magnet 214a has magnetic attraction forces 234 to the seal magnets 200 in the magnetic zipper seal assembly 122, and causes the magnetic zipper seal assembly 122 to be in the unsealed state 233b. As further shown in FIG. 8C, the second control magnet 214b has the first end 220a with the positive pole 216 and the second end 220b with the negative pole 218, and the second control magnet 214b has magnetic attraction forces 234 to the seal magnets 200 in the magnetic zipper seal assembly 122, and causes the magnetic zipper seal assembly 122 to be in the sealed state 233a.

As shown in FIG. 8C, the magnetic zipper seal assembly 122 is positioned between the control magnets 214. With the open/close mechanism 196 in the form of the two-sided external magnet attraction open/close mechanism 196b, the opening and closing of the magnetic zipper seal assembly 122 uses the magnetic attraction forces 234 (see FIG. 8C) from the separate control magnets 214 located on opposite sides 238 (see FIG. 8C) and located external to the magnetic zipper seal assembly 122.

Figure 8D:
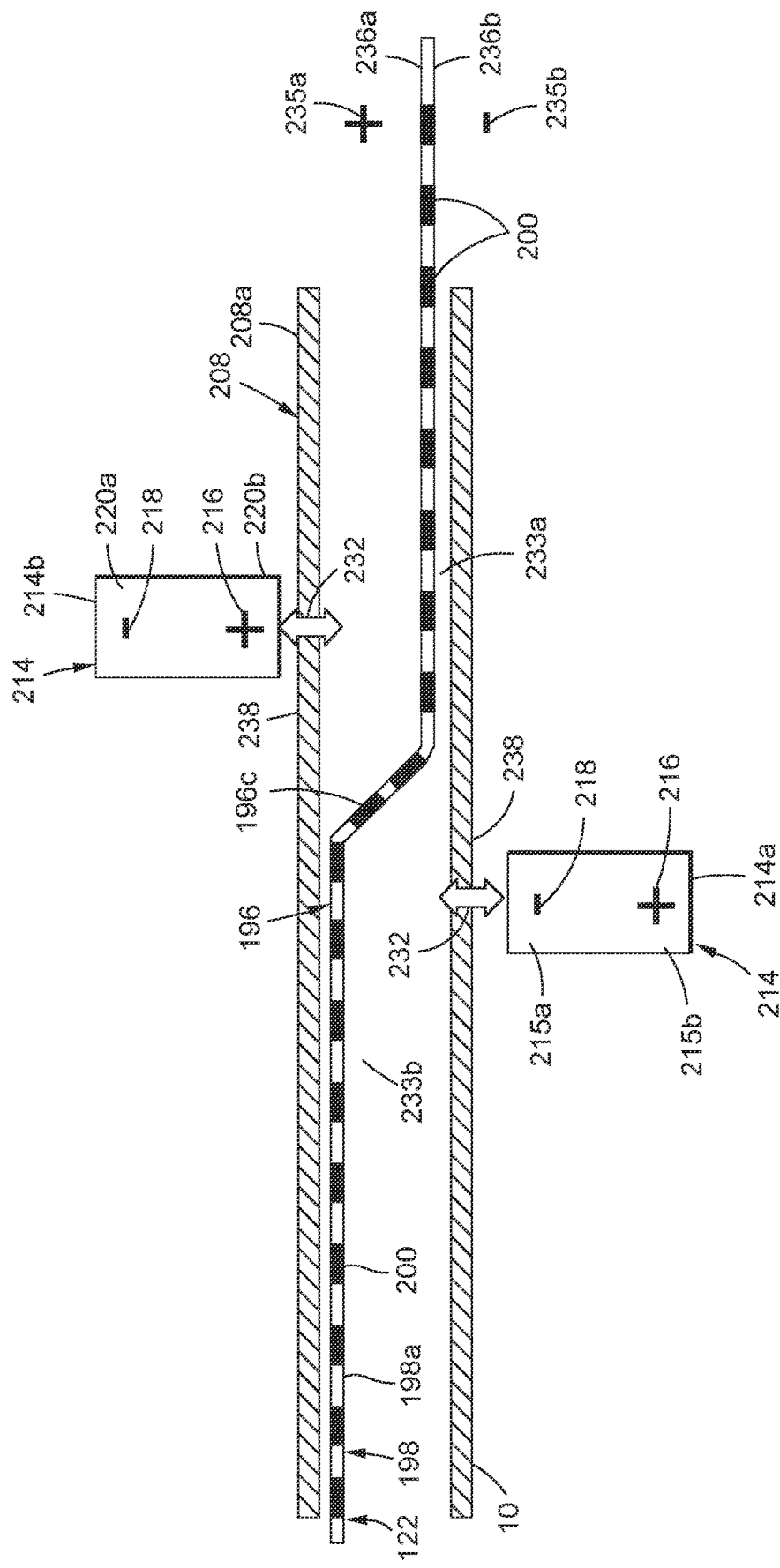
FIG. 8D is a schematic illustration of a side view of a magnetic zipper seal assembly having a two-sided external magnet repulsion open/close mechanism.
Figure 8E:
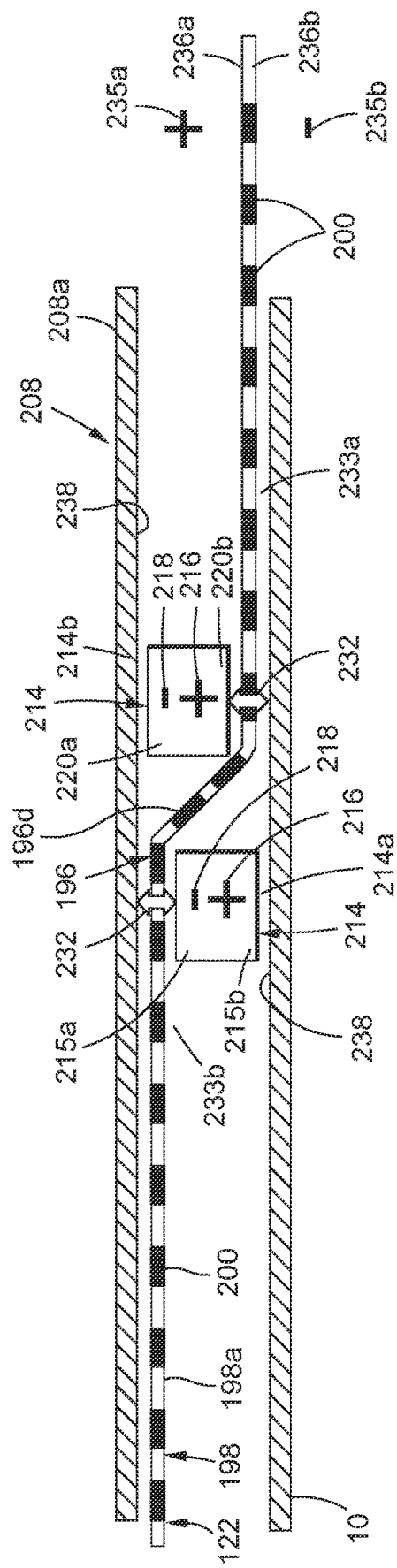
FIG. 8E is a schematic illustration of a side view of a magnetic zipper seal assembly having a two-sided internal magnet repulsion open/close mechanism.
Figure 8F:
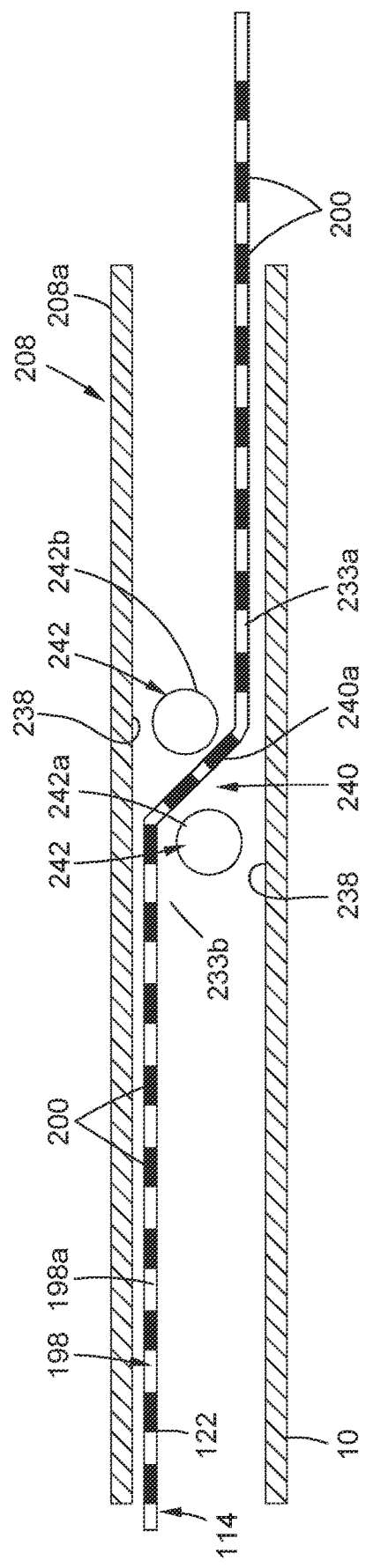
FIG. 8F is a schematic illustration of a side view of a physical mechanism to open and close a movable barrier element.

Now referring to FIG. 8D, FIG. 8D is a schematic illustration of a side view of a magnetic zipper seal assembly 122 having the open/close mechanism 196 in the form of a two-sided external magnet repulsion open/close mechanism 196c for opening and closing the magnetic zipper seal assembly 122. FIG. 8D shows the magnetic zipper seal assembly 122 comprising the magnetic seal 198, such as in the form of the magnetic zipper seal 198a, with the seal magnets 200. The magnetic zipper seal assembly 122 has the positive polarity 235a on the upper side 236a and the negative polarity 235b on the lower side 236b.

FIG. 8D further shows the control magnets 214, such as the first control magnet 214a and the second control magnet 214b on opposite sides 238 of the magnetic zipper seal assembly 122. The first control magnet 214a is positioned below the scalable area gripper 10, and is positioned below, and external to, the magnetic zipper seal assembly 122. The second control magnet 214b is positioned on the elongated member 208, such as the rail 208a, made of the ferrous material, and is positioned above, and external to, the magnetic zipper seal assembly 122. As shown in FIG. 8D, the first control magnet 214a has the first end 215a with the negative pole 218 and the second end 215b with the positive pole 216, and the first control magnet 214a has magnetic repulsion forces 232 to the seal magnets 200 in the magnetic zipper seal assembly 122, and causes the magnetic zipper seal assembly 122 to be in the unsealed state 233b. As further shown in FIG. 8D, the second control magnet 214b has the first end 220a with the negative pole 218 and the second end 220b with the positive pole 216, and the second control magnet 214b has magnetic repulsion forces 232 to the seal magnets 200 in the magnetic zipper seal assembly 122, and causes the magnetic zipper seal assembly 122 to be in the sealed state 233a.

As shown in FIG. 8D, the magnetic zipper seal assembly 122 is positioned between the control magnets 214. With the open/close mechanism 196 in the form of the two-sided external magnet repulsion open/close mechanism 196c, the opening and closing of the magnetic zipper seal assembly 122 uses the magnetic repulsion forces 232 (see FIG. 8D) from the separate control magnets 214 located on opposite sides 238 (see FIG. 8D) and located external to the magnetic zipper seal assembly 122.

Now referring to FIG. 8E, FIG. 8E is a schematic illustration of a side view of a magnetic zipper seal assembly 122 having the open/close mechanism 196 in the form of a two-sided internal magnet repulsion open/close mechanism 196d for opening and closing the magnetic zipper seal assembly 122. FIG. 8E shows the magnetic zipper seal assembly 122 comprising the magnetic seal 198, such as in the form of the magnetic zipper seal 198a, with the seal magnets 200. The magnetic zipper seal assembly 122 has the positive polarity 235a on the upper side 236a and the negative polarity 235b on the lower side 236b.

FIG. 8E further shows the control magnets 214, such as the first control magnet 214a and the second control magnet 214b on opposite sides 238 of the magnetic zipper seal assembly 122, and positioned internal to the magnetic zipper seal assembly 122. The first control magnet 214a is positioned above the scalable area gripper 10, and is positioned below, and internal to, the magnetic zipper seal assembly 122. The second control magnet 214b is positioned below the elongated member 208, such as the rail 208a, made of the ferrous material, and is positioned above, and internal to, the magnetic zipper seal assembly 122. As shown in FIG. 8E, the first control magnet 214a has the first end 215a with the negative pole 218 and the second end 215b with the positive pole 216, and the first control magnet 214a has magnetic repulsion forces 232 to the seal magnets 200 in the magnetic zipper seal assembly 122, and causes the magnetic zipper seal assembly 122 to be in the unsealed state 233b. As further shown in FIG. 8E, the second control magnet 214b has the first end 220a with the negative pole 218 and the second end 220b with the positive pole 216, and the second control magnet 214b has magnetic repulsion forces 232 to the seal magnets 200 in the magnetic zipper seal assembly 122, and causes the magnetic zipper seal assembly 122 to be in the sealed state 233a.

As shown in FIG. 8E, the magnetic zipper seal assembly 122 is positioned between the control magnets 214. With the open/close mechanism 196 in the form of the two-sided internal magnet repulsion open/close mechanism 196d, the opening and closing of the magnetic zipper seal assembly 122 uses the magnetic repulsion forces 232 (see FIG. 8E) from the separate control magnets 214 located on opposite sides 238 (see FIG. 8E) and located internal to the magnetic zipper seal assembly 122.

Now referring to FIG. 8F, FIG. 8F is a schematic illustration of a side view of a physical mechanism 240, such as a physical switch seal 240a, to open and close the movable barrier element 114, such as the magnetic zipper seal assembly 122. FIG. 8F shows the magnetic zipper seal assembly 122 comprising the magnetic seal 198, such as in the form of the magnetic zipper seal 198a, with the seal magnets 200.

FIG. 8F further shows non-ferrous elements 242, including a first non-ferrous element 242a and a second non-ferrous element 242b, positioned on opposite sides 238 of the magnetic zipper seal assembly 122, and positioned internal to the magnetic zipper seal assembly 122. The non-ferrous elements 242 are each made of a non-ferrous material that is not magnetic. The non-ferrous material may comprise a metal or alloy that does not have iron (non-iron metal or non-iron alloy), does not have steel (non-steel metal or non-steel alloy), or does not have iron or steel components. For example, the non-ferrous material may comprise a metal such as copper, aluminum, nickel, zinc, lead, tin, manganese, brass, bronze, or another suitable non-ferrous metal material. The non-ferrous material may also comprise plastics, composites, or other suitable non-ferrous materials.

The first non-ferrous element 242*a* is positioned above the scalable area gripper 10, and is positioned below, and internal to, the magnetic zipper seal assembly 122. The second non-ferrous element 242*b* is positioned below the elongated member 208, such as the rail 208*a*, made of the ferrous material, and is positioned above, and internal to, the magnetic zipper seal assembly 122. The first non-ferrous element 242*a* and the second non-ferrous element 242*b* physically interact with the magnetic zipper seal assembly 122, such as pushing and moving the magnetic zipper seal assembly 122 from one side to the next side. Magnetic forces, for example, magnetic attraction forces 234 (see FIG. 8A), cause the magnetic zipper seal assembly 122 to attach itself to the ferrous material of the elongated member 208, such as the rail 208*a*, and to cause the magnetic zipper seal assembly 122 to go from the sealed state 233*a* to the unsealed state 233*b*.

As shown in FIG. 8F, the magnetic zipper seal assembly 122 is positioned between the non-ferrous elements 242. With the open/close mechanism 196 in the form of the physical mechanism 240, such as a physical switch seal 240*a*, the opening and closing of the magnetic zipper seal assembly 122 uses the non-ferrous elements 242 located on opposite sides 238 (see FIG. 8F) and located internal to the magnetic zipper seal assembly 122, and adjacent, or near, the ferrous material of the elongated member 208, such as the rail 208*a*.

Figure 9:
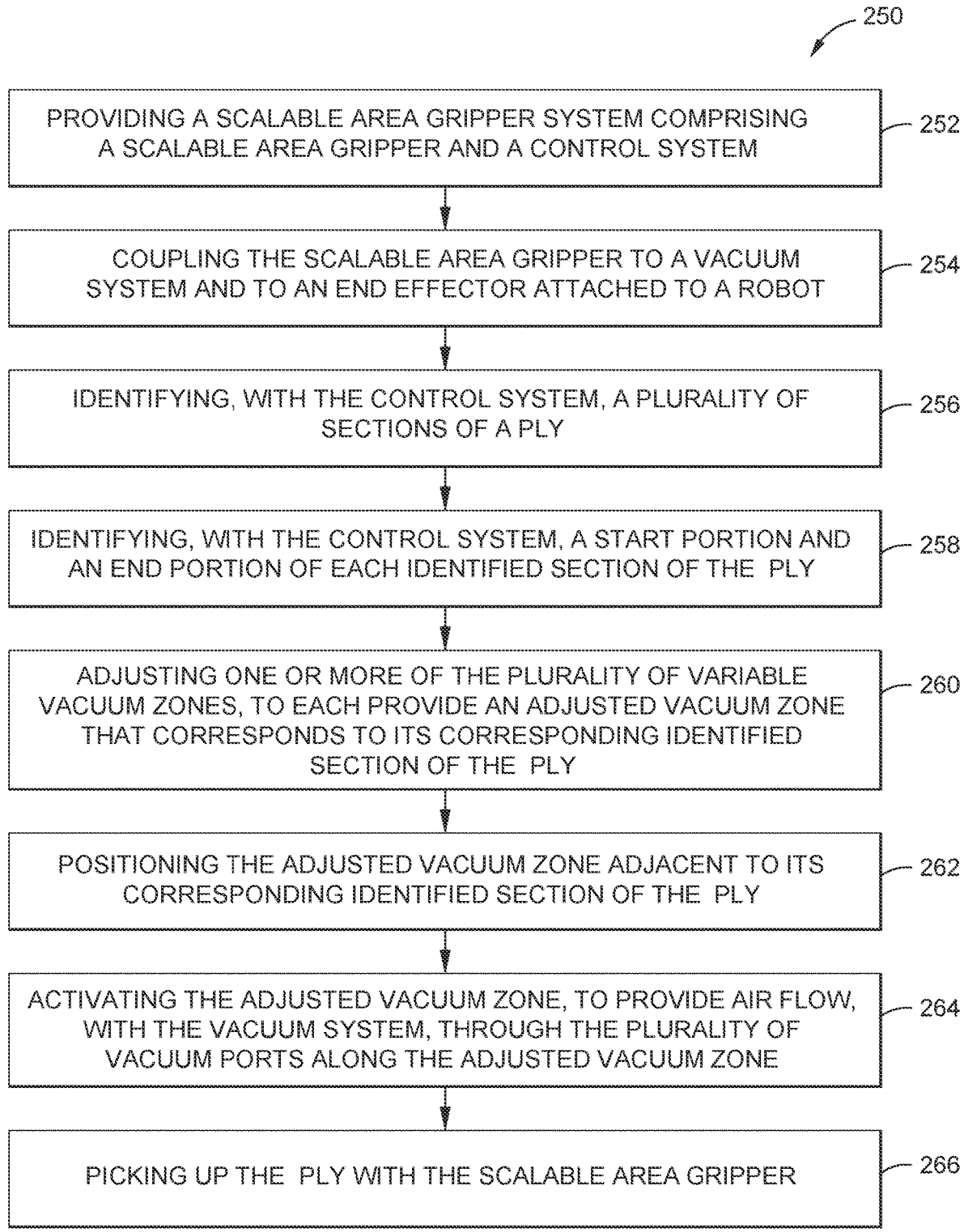
FIG. 9 is an illustration of a flow diagram of an exemplary version of a method of the disclosure.

Now referring to FIG. 9, FIG. 9 is an illustration of a flow diagram of an exemplary version of a method 250 of the disclosure. In another version of the disclosure, there is provided the method 250 for picking up a material 40 (see FIGS. 1, 5A), such as a ply 42 (see FIGS. 1, 5A), in a material handling process 16 (see FIG. 1) for composite manufacturing 18 (see FIG. 1).

The blocks in FIG. 9 represent operations and/or portions thereof, or elements, and lines connecting the various blocks do not imply any particular order or dependency of the operations or portions thereof, or elements. FIG. 9 and the disclosure of the steps of the method 250 set forth herein should not be interpreted as necessarily determining a sequence in which the steps are to be performed. Rather, although one illustrative order is indicated, it is to be understood that the sequence of the steps may be modified when appropriate. Accordingly, certain operations may be performed in a different order or simultaneously.

As shown in FIG. 9, the method 250 comprises step 252 of providing a scalable area gripper system 12 (see FIG. 1). The scalable area gripper system 12 comprises a scalable area gripper 10 (see FIGS. 1, 5A, 6A) having a structural frame 84 (see FIGS. 1, 5A, 6A) and a plurality of variable vacuum zones 104 (see FIGS. 1, 5A, 6A) coupled to the structural frame 84. Each variable vacuum zone 104 comprises, (i) a plurality of vacuum ports 108 (see FIGS. 1, 5A, 6A), (ii) one or more movable barrier elements 114 (see FIGS. 1, 5A, 6A), and (iii) an actuator assembly 124 (see FIGS. 1, 5A, 6B) configured to move each of the one or more movable barrier elements 114 across one or more of the plurality of vacuum ports 108, to cause the one or more plurality of vacuum ports 108 to go between a closed state 110 (see FIG. 1) and an open state 112 (see FIG. 1). The scalable area gripper system 12 further comprises a control system 136 (FIGS. 1, 4) coupled to the scalable area gripper 10.

The step 252 of providing the scalable area gripper system 12 may further comprise, in one version, providing the scalable area gripper system 12 comprising the scalable area gripper 10 having the structural frame 84 comprising a flat apparatus 86 (see FIGS. 1, 5A), where the plurality of variable vacuum zones 104 are disposed across the flat apparatus 86. In one version, as shown in FIG. 5A, the flat apparatus 86 comprises a two-dimensional, generally flat or planar apparatus, having four sides 88, such as sides 88*a*, 88*b*, 88*c*, 88*d*, that are coupled together to form a rectangular shape 90 or configuration.

The step 252 of providing the scalable area gripper system 12 may further comprise, in another version, providing the scalable area gripper system 12 comprising the scalable area gripper 10 having the structural frame 84 comprising a roller apparatus 92 (see FIGS. 1, 6A), where the plurality of variable vacuum zones 104 are disposed circumferentially along the roller apparatus 92. As shown in FIG. 6A, the roller apparatus 92 has a body 94 with a cylindrical shape 96 or configuration, and with a circumference 98.

In yet another version, the structural frame 84 comprises a curved apparatus 100 (see FIG. 1), other than the roller apparatus 92, and comprises a three-dimensional apparatus with two or more curved sides 101 (see FIG. 1) having one or more curves 102 (see FIG. 1), and with the plurality of variable vacuum zones 104 disposed across the curved apparatus 100. The structural frame 84 may also comprise another suitably shaped apparatus.

The step 252 of providing the scalable area gripper system 12 may further comprise, providing the scalable area gripper system 12 comprising the scalable area gripper 10 having the one or more movable barrier elements 114 each comprising one of, a movable seal 116 (see FIGS. 1, 5A), a magnetic zipper seal assembly 122 (see FIGS. 1, 8A), and a mechanical shield 118 (see FIGS. 1, 7A), including a belt shield assembly 120 (see FIGS. 1, 7A). The method 250 may further comprise opening and closing the magnetic zipper seal assembly 122 using one of, magnetic attraction forces 234 (see FIG. 8A) and magnetic repulsion forces 232 (see FIG. 8A) from separate control magnets 214 (see FIG. 8A) located between each side of a magnetic seal 198 (see FIG. 8A) of the magnetic zipper seal assembly 122, or located external to the magnetic seal 198 of the magnetic zipper seal assembly 122, or a physical mechanism 240 (see FIG. 8F), such as a physical switch seal 240*a* (see FIG. 8F), to open and close the magnetic zipper seal assembly 122.

The movable barrier element 114 comprising the magnetic zipper seal assembly 122, may have an open/close mechanism 196 comprising one of, a single-sided external magnet open/close mechanism 196*a* (see FIGS. 8A, 8B), a two-sided external magnet attraction open/close mechanism 196*b* (see FIG. 8C), a two-sided external magnet repulsion open/close mechanism 196*c* (see FIG. 8D), a two-sided internal magnet repulsion open/close mechanism 196*d* (see FIG. 8E), a physical mechanism 240 (see FIG. 8F), such as a physical switch seal 240*a* (see FIG. 8F), or another suitable open/close mechanism.

As shown in FIG. 9, the method 250 further comprises step 254 of coupling the scalable area gripper 10 to a vacuum system 30 (see FIGS. 1, 4, 5B, 5E, 6A) and to an end effector 26 (see FIG. 4) attached to a robot 22 (see FIGS. 1, 4).

As shown in FIG. 9, the method 250 further comprises step 256 of identifying, with the control system 136, a plurality of sections 72 (see FIGS. 1, 5A) of the material 40 (see FIGS. 1, 5A), such as the ply 42 (see FIGS. 1, 5A).

As shown in FIG. 9, the method 250 further comprises step 258 of identifying, with the control system 136, a start portion 76 (see FIGS. 1, 5A), such as a start point 77 (see FIGS. 1, 5A), and an end portion 78 (see FIGS. 1, 5A), such as an end point 79 (see FIGS. 1, 5A), of each identified section 72a of the material 40, such as the ply 42, based on boundaries 68, such as ply boundaries 70, of the material 40, such as the ply 42.

As shown in FIG. 9, the method 250 further comprises step 260 of adjusting one or more of the plurality of variable vacuum zones 104, to each provide an adjusted vacuum zone 105 (see FIGS. 1, 5A, 6A) that corresponds to its corresponding identified section 72a of the material 40, such as the ply 42.

The adjusted vacuum zone 105 may be determined by determining the boundaries 68 of the material 40, such as the ply boundaries 70 of the ply 42, and calculating the start portion 76 and the end portion 78 of each identified section 72a of the material 40, such as the ply 42, and driving or moving the one or more movable barrier elements 114 to a respective start portion 76a (see FIGS. 1, 5A) of the adjusted vacuum zone 105, corresponding to the start portion 76, and to a respective end portion 78a (see FIGS. 1, 5A) of the adjusted vacuum zone 105, corresponding to the end portion 78.

As shown in FIG. 9, the method 250 further comprises step 262 of positioning the adjusted vacuum zone 105 adjacent to its corresponding identified section 72a of the material 40, such as the ply 42. As shown in FIG. 9, the method 250 further comprises step 264 of activating the adjusted vacuum zone 105 to provide air flow 38a with the vacuum system 30, through the plurality of vacuum ports 108 along the adjusted vacuum zone 105.

As shown in FIG. 9, the method 250 further comprises step 266 of picking up the material 40, such as the ply 42, with the scalable area gripper 10, from a work surface 65 (see FIG. 4), during the material handling process 16 for the composite manufacturing 18. The step 266 of picking up the material 40, such as the ply 42, further comprises, removing and separating the material 40, such as the ply 42, from a waste material 64 (see FIGS. 1, 4), adjacent the material 40, such as the ply 42, on the work surface 65.

Figure 10:
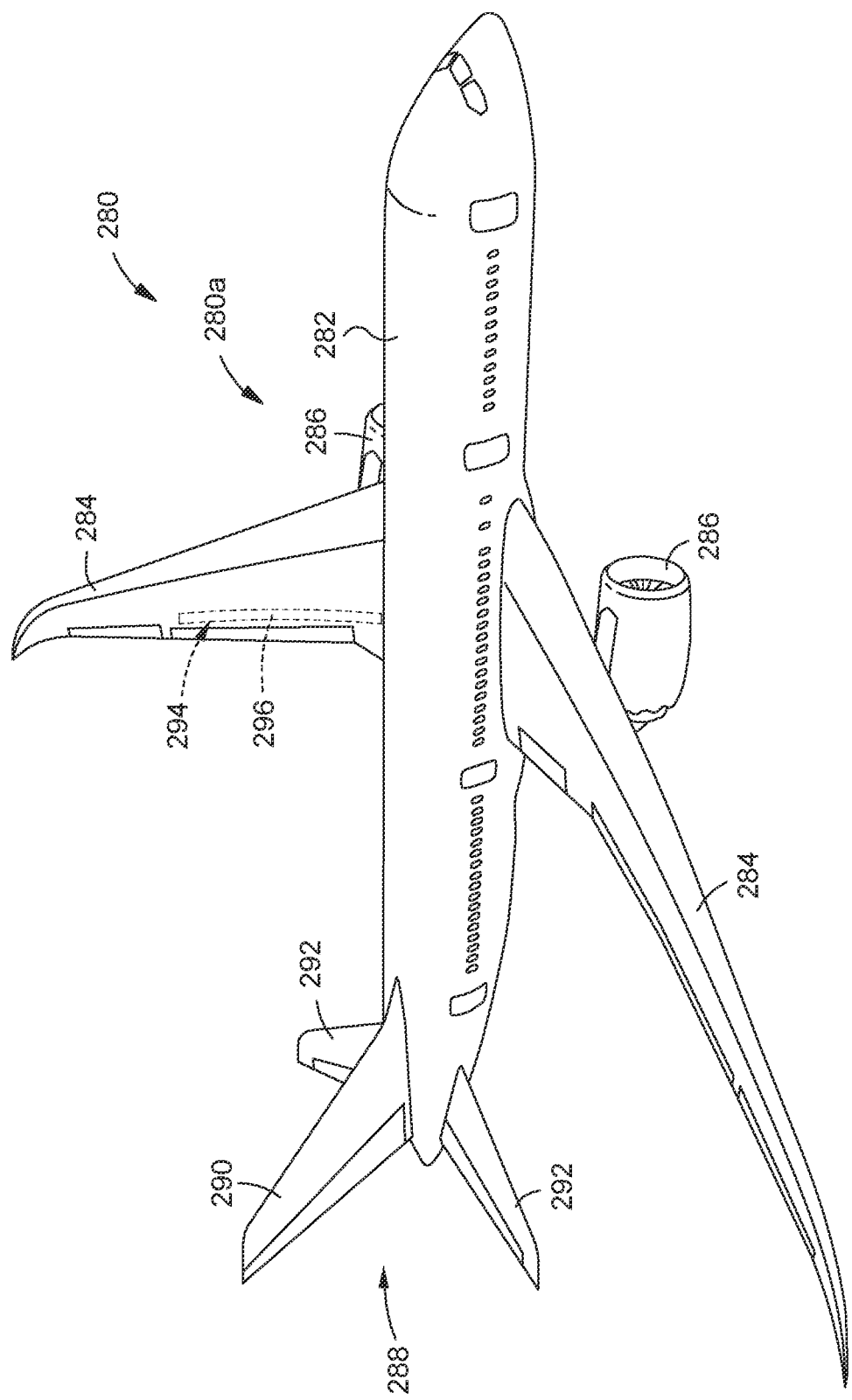
FIG. 10 is an illustration of a perspective view of an aircraft incorporating an aircraft part made with an exemplary version of an automated material handling system using an exemplary version of a scalable area gripper system having a scalable area gripper of the disclosure.

Now referring to FIG. 10, FIG. 10 is an illustration of a perspective view of a vehicle 280, such as an aircraft 280a, incorporating a composite part 294, such as in the form of an aircraft composite part 296, for example, a wing spar, made with an exemplary version of the automated material handling system 14 (see FIG. 1) using an exemplary version of the scalable area gripper system 12 having the scalable area gripper 10 disclosed herein. As shown in FIG. 10, the vehicle 280, such as the aircraft 280a, includes a fuselage 282, wings 284, engines 286, and an empennage 288. As shown in FIG. 10, the empennage 288 comprises a vertical stabilizer 290 and horizontal stabilizers 292. The composite parts 294 made with the automated material handling system 14 using the scalable area gripper system 12 having the scalable area gripper 10 may be used in a variety of industries and applications including, but not limited to, in connection with the manufacture of aircraft 280a and other aerospace structures and vehicles, including spacecraft, and rotorcraft, as well as vehicles such as watercraft, trains, or other suitable vehicles or structures.

Figure 11:
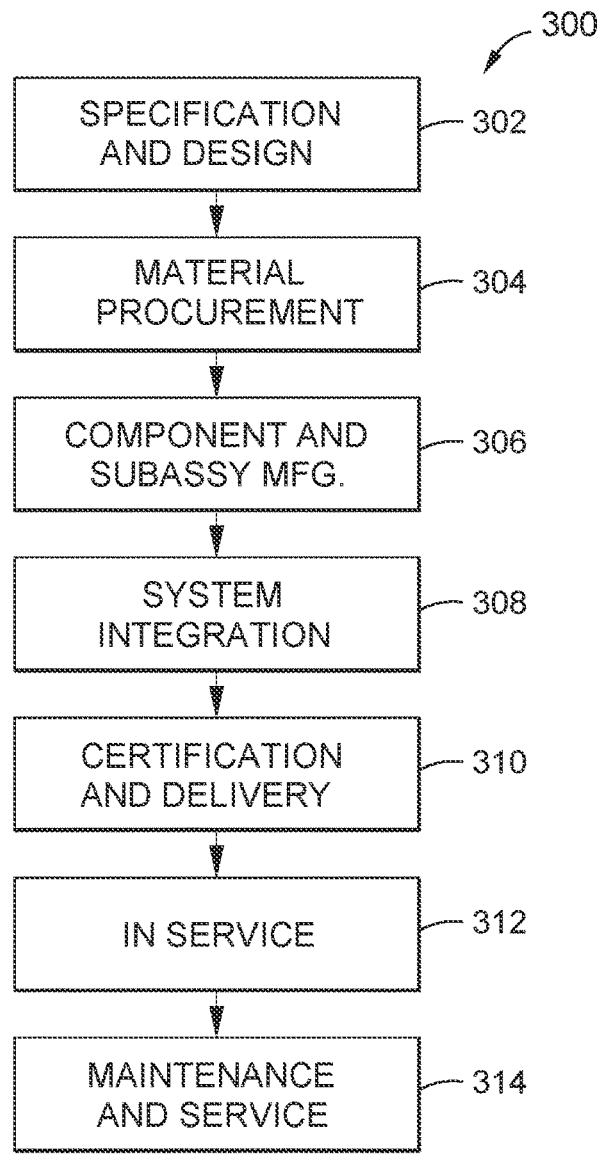
FIG. 11 is an illustration of a flow diagram of an exemplary aircraft manufacturing and service method.
Figure 12:
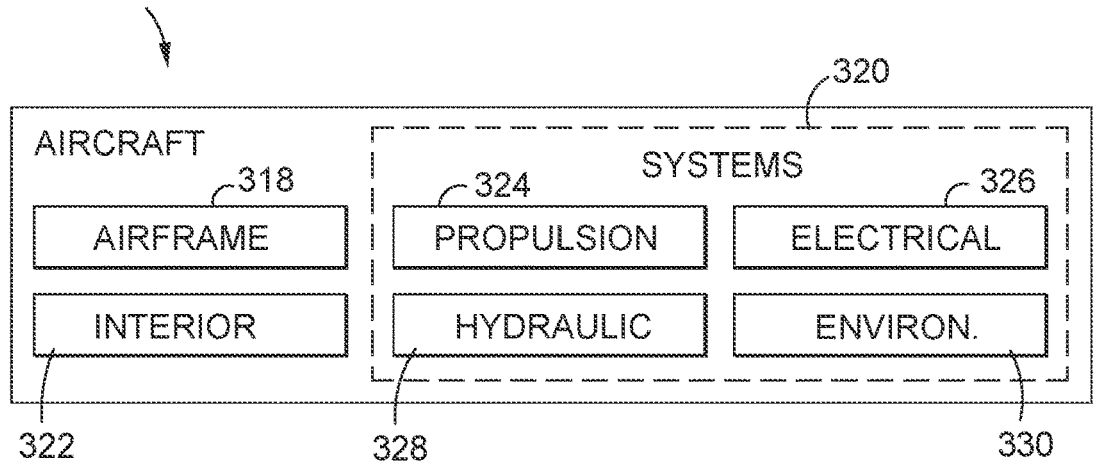
FIG. 12 is an illustration of an exemplary block diagram of an aircraft.

Now referring to FIGS. 11 and 12, FIG. 11 is an illustration of a flow diagram of an exemplary aircraft manufacturing and service method 300, and FIG. 12 is an illustration of an exemplary block diagram of an aircraft 316. Referring to FIGS. 11 and 12, versions of the disclosure may be described in the context of the aircraft manufacturing and service method 300 as shown in FIG. 11, and the aircraft 316 as shown in FIG. 12.

During pre-production, exemplary aircraft manufacturing and service method 300 may include specification and design 302 of the aircraft 316 and material procurement 304. During manufacturing, component and subassembly manufacturing 306 and system integration 308 of the aircraft 316 takes place. Thereafter, the aircraft 316 may go through certification and delivery 310 in order to be placed in service 312. While in service 312 by a customer, the aircraft 316 may be scheduled for routine maintenance and service 314 (which may also include modification, reconfiguration, refurbishment, and other suitable services).

Each of the processes of the aircraft manufacturing and service method 300 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 12, the aircraft 316 produced by the exemplary aircraft manufacturing and service method 300 may include an airframe 318 with a plurality of systems 320 and an interior 322. Examples of the plurality of systems 320 may include one or more of a propulsion system 324, an electrical system 326, a hydraulic system 328, and an environmental system 330. Any number of other systems may be included. Although an aerospace example is shown, the principles of the disclosure may be applied to other industries, such as the automotive industry.

Methods and systems embodied herein may be employed during any one or more of the stages of the aircraft manufacturing and service method 300. For example, components or subassemblies corresponding to component and subassembly manufacturing 306 may be fabricated or manufactured in a manner similar to components or subassemblies produced while the aircraft 316 is in service 312. Also, one or more apparatus embodiments, method embodiments, or a combination thereof, may be utilized during component and subassembly manufacturing 306 and system integration 308, for example, by substantially expediting assembly of or reducing the cost of the aircraft 316. Similarly, one or more of apparatus embodiments, method embodiments, or a combination thereof, may be utilized while the aircraft 316 is in service 312, for example and without limitation, to maintenance and service 314.

Disclosed versions of the scalable area gripper 10 (see FIGS. 1, 5A, 6A), the scalable area gripper system 12 (see FIGS. 1, 4, 5A), the automated material handling system 14 (see FIGS. 1, 4), and the method 250 (see FIG. 9) provide for a variable zoned gripper and method of gripping a material 40, such as a ply 42, for example, a ply 42 having unidirectional fibers 50a (see FIG. 1). Adhesion area control 80 (see FIG. 1) based on boundaries 68, such as ply boundaries 70, simplifies a control issue, and instead of controlling hundreds of individual pixels across a section of a pick area, the control points 74 (see FIG. 1) are at a start portion 76 (see FIG. 1) and an end portion 78 (see FIG. 1) of each ply 42. Setting two control points 74 at the start portion 76 and the end portion 78 of each ply 42 in one dimension, avoids having many individually controlled valves to switch a vacuum along an entire length of the ply 42 or fabric. Further, controlling the ply adhesion 148 (see FIG. 1) and the air flow 38a (see FIG. 1) at these control points 74, based on the boundaries 68, such as the ply boundaries 70, avoids using discrete control along the length of a section 72 of the ply 42.

In addition, disclosed versions of the scalable area gripper 10 (see FIGS. 1, 5A, 6A), the scalable area gripper system 12 (see FIGS. 1, 4, 5A), the automated material handling system 14 (see FIGS. 1, 4), and the method 250 (see FIG. 9) provide for a plurality of variable vacuum zones 104 that enable a scalable area gripper 10 having a structural frame 84 (see FIG. 1) in a flat apparatus 86 (see FIGS. 1, 5A) form, in a roller apparatus 92 form (see FIGS. 1, 6A), or in a curved apparatus 100 (see FIG. 1) form. The variable ply adhesion zone can be implemented with several versions, such as movable barrier elements 114 (see FIG. 1), including movable seals 116 (see FIG. 1), mechanical shields 118 (see FIG. 1), including a belt shield assembly 120 (see FIGS. 1, 7A), a magnetic zipper seal assembly 122 (see FIGS. 1, 8A), or other suitable movable barrier elements. The movable barrier elements 114 are actuated or moved with an actuator assembly 124 (see FIGS. 1, 5A, 6A) coupled to the movable barrier elements 114. The actuator assembly 124 is configured to move each of the one or more movable barrier elements 114 across one or more vacuum ports 108 of each variable vacuum zone 104, to cause the vacuum ports 108 to go between the closed state 110 (see FIG. 1) and the open state 112 (see FIG. 1). One or more of the plurality of variable vacuum zones 104 is/are configured to be adjusted, to each provide an adjusted vacuum zone 105 (see FIGS. 1, 5A, 6A) that corresponds to a corresponding identified section 72a (see FIG. 1) of a material 40, such as a ply 42, having the start portion 76 (see FIG. 1) and the end portion 78 (see FIG. 1). Further, each adjusted vacuum zone 105 is configured to be positioned adjacent to its corresponding identified section 72a of the material 40, such as the ply 42, and is configured to be activated to selectively pick up the material 40, such as the ply 42, during a material handling process 16 (see FIG. 1) for composite manufacturing 18 (see FIG. 1).

Moreover, disclosed versions of the scalable area gripper 10 (see FIGS. 1, 5A, 6A), the scalable area gripper system 12 (see FIGS. 1, 4, 5A), the automated material handling system 14 (see FIGS. 1, 4), and the method 250 (see FIG. 9) provide a lightweight and rapid solution for actively controlled area grippers for a material handling process 16 for composite manufacturing 18. Further, disclosed versions of the scalable area gripper 10 (see FIGS. 1, 5A, 6A), the scalable area gripper system 12 (see FIGS. 1, 4, 5A), the automated material handling system 14 (see FIGS. 1, 4), and the method 250 (see FIG. 9) provide an automated system and method to lay up high quality laminates from dry unidirectional materials. A software program 144, such as a custom software program, may be used to determine the boundaries 68 of the material 40, such as the ply boundaries 70 of the ply 42, to be picked up by the scalable area gripper 10, and may be used to calculate the start portion 76 and the end portion 78 of the ply 42 and the start portion 76a (see FIG. 1) and the end portion 78a (see FIG. 1) of the adjusted vacuum zone 105 (see FIG. 1). The actuator assembly 124 is used to drive the one or more movable barrier elements 114 to the start portion 76 and the end portion 78 of the ply 42 and the start portion 76a and the end portion 78a of the adjusted vacuum zone 105.

Further, disclosed versions of the scalable area gripper 10 (see FIGS. 1, 5A, 6A), the scalable area gripper system 12 (see FIGS. 1, 4, 5A), the automated material handling system 14 (see FIGS. 1, 4), and the method 250 (see FIG. 9) provide for handling and selectively removing material 40, such as plies 42, including cut plies 42a, for example, cut composite plies, in composite manufacturing 18, provide simplified adhesion area control 80 based on boundaries 68, such as ply boundaries 70, and determine the start portion 76 and the end portion 78 of an identified section 72a of a ply 42, and avoid a need for discrete control along a length of the identified section 72a, and provide additional advantages over known apparatuses, systems, and methods.

Further, the disclosure comprises embodiments according to the following clauses:

Clause 1. A scalable area gripper comprising:
a structural frame; and
a plurality of variable vacuum zones coupled to the structural frame, each variable vacuum zone comprising:
(i) a plurality of vacuum ports;
(ii) one or more movable barrier elements; and
(iii) an actuator assembly configured to move each of the one or more movable barrier elements across one or more of the plurality of vacuum ports, to cause the one or more plurality of vacuum ports to go between a closed state and an open state,
wherein one or more of the plurality of variable vacuum zones is configured to be adjusted, to each provide an adjusted vacuum zone that corresponds to a corresponding identified section of a material having a start portion and an end portion, and
further wherein each adjusted vacuum zone is configured to be positioned adjacent to its corresponding identified section of the material, and is configured to be activated to pick up the material during a material handling process.

Clause 2. The scalable area gripper of Clause 1, wherein the scalable area gripper is coupled to a control system comprising:
a position controller configured to operably control positioning of the scalable area gripper with respect to the material;
an actuator assembly controller configured to operably control the actuator assembly, to move each of the one or more movable barrier elements across one or more of the plurality of vacuum ports; and
a computer configured to process a software program, the software program configured to determine boundaries of the material, and to calculate the start portion and the end portion, based on the boundaries of the material.

Clause 3. The scalable area gripper of Clause 1 or Clause 2, wherein the structural frame of the scalable area gripper is configured for attachment to an end effector attached to a robot.

Clause 4. The scalable area gripper of Clauses 1 to 3, wherein the structural frame comprises a flat apparatus, and the plurality of variable vacuum zones are disposed on the flat apparatus.

Clause 5. The scalable area gripper of any of Clauses 1 to 3, wherein the structural frame comprises a roller apparatus, and the plurality of variable vacuum zones are disposed circumferentially along the roller apparatus.

Clause 6. The scalable area gripper of any of Clauses 1 to 5, wherein each of the one or more movable barrier elements comprises a movable seal.

Clause 7. The scalable area gripper of any of Clauses 1 to 6, wherein each of the one or more movable barrier elements comprises a magnetic zipper seal assembly.

Clause 8. The scalable area gripper of any of Clauses 1 to 6, wherein each of the one or more movable barrier elements comprises a mechanical shield, including a belt shield assembly.

Clause 9. The scalable area gripper of any of Clauses 1 to 8, wherein the actuator assembly comprises one of a rotary actuator, and a linear actuator, the linear actuator including a motor driven pulley and cable actuator assembly, a rack and pinion actuator assembly, a belt drive assembly, and a screw drive assembly.

Clause 10. An automated material handling system for a material handling process in composite manufacturing, the automated material handling system comprising:
a material to be picked up and removed from a work surface;
a robot with an end effector;
a scalable area gripper system comprising:
a scalable area gripper having a structural frame and a plurality of variable vacuum zones coupled to the structural frame, each variable vacuum zone comprising:
(i) a plurality of vacuum ports;
(ii) one or more movable barrier elements; and
(iii) an actuator assembly configured to move each of the one or more movable barrier elements across one or more of the plurality of vacuum ports, to cause the one or more plurality of vacuum ports to go between a closed state and an open state; and
a control system coupled to the scalable area gripper; and
a vacuum system coupled to the scalable area gripper, the vacuum system having a vacuum source to provide air flow through the one or more plurality of vacuum ports in the open state,
wherein the scalable area gripper system is configured to adjust one or more of the plurality of variable vacuum zones, to each provide an adjusted vacuum zone that corresponds to a corresponding identified section of the material having a start portion and an end portion, and
further wherein the scalable area gripper system is configured to position each adjusted vacuum zone adjacent to its corresponding identified section of the material, and is configured to activate the adjusted vacuum zone, to pick up and remove the material from the work surface during the material handling process in the composite manufacturing.

Clause 11. The automated material handling system of Clause 10, wherein the control system comprises:
a position controller configured to operably control positioning of the scalable area gripper with respect to the material;
an actuator assembly controller configured to operably control the actuator assembly, to move each of the one or more movable barrier elements across one or more of the plurality of vacuum ports; and
a computer configured to process a software program, the software program configured to determine boundaries of the material, and to calculate the start portion and the end portion, based on the boundaries of the material.

Clause 12. The automated material handling system of Clause 10 or Clause 11, wherein the structural frame comprises a flat apparatus, and the plurality of variable vacuum zones are disposed on the flat apparatus.

Clause 13. The automated material handling system of Clause 10 or Clause 11, wherein the structural frame comprises a roller apparatus, and the plurality of variable vacuum zones are disposed circumferentially along the roller apparatus.

Clause 14. The automated material handling system of any of Clauses 10 to 13, wherein each of the one or more movable barrier elements comprises one of, a movable seal, a magnetic zipper seal assembly, and a mechanical shield, including a belt shield assembly.

Clause 15. A method of picking up a material in a material handling process for composite manufacturing, the method comprising the steps of:
providing a scalable area gripper system comprising:
a scalable area gripper having a structural frame and a plurality of variable vacuum zones coupled to the structural frame, each variable vacuum zone comprising:
(i) a plurality of vacuum ports;
(ii) one or more movable barrier elements; and
(iii) an actuator assembly configured to move each of the one or more movable barrier elements across one or more of the plurality of vacuum ports, to cause the one or more plurality of vacuum ports to go between a closed state and an open state; and
a control system coupled to the scalable area gripper;
coupling the scalable area gripper to a vacuum system and to an end effector attached to a robot;
identifying, with the control system, a plurality of sections of the material;
identifying, with the control system, a start portion and an end portion of each identified section of the material, based on boundaries of the material;
adjusting one or more of the plurality of variable vacuum zones, to each provide an adjusted vacuum zone that corresponds to its corresponding identified section of the material;
positioning the adjusted vacuum zone adjacent to its corresponding identified section of the material;
activating the adjusted vacuum zone to provide air flow, with the vacuum system, through the plurality of vacuum ports along the adjusted vacuum zone; and
picking up the material, with the scalable area gripper, from a work surface, during the material handling process for the composite manufacturing.

Clause 16. The method of Clause 15, wherein providing the scalable area gripper system further comprises, providing the scalable area gripper system comprising the scalable area gripper having the structural frame comprising a flat apparatus, where the plurality of variable vacuum zones are disposed on the flat apparatus.

Clause 17. The method of Clause 15, wherein providing the scalable area gripper system further comprises, providing the scalable area gripper system comprising the scalable area gripper having the structural frame comprising a roller apparatus, where the plurality of variable vacuum zones are disposed circumferentially along the roller apparatus.

Clause 18. The method of any of Clauses 15 to 17, wherein providing the scalable area gripper system further comprises, providing the scalable area gripper system comprising the scalable area gripper having the one or more movable barrier elements each comprising one of, a movable seal, a magnetic zipper seal assembly, and a mechanical shield, including a belt shield assembly.

Clause 19. The method of Clause 18, further comprising opening and closing the magnetic zipper seal assembly using one of, magnetic attraction and repulsion forces from separate movable control magnets located between each side of a magnetic zipper of the magnetic zipper assembly, or located external to the magnetic zipper of the magnetic zipper assembly, or a physical mechanism to open and close the magnetic zipper seal assembly.

Clause 20. The method of any of Clauses 15 to 19, wherein picking up the material further comprises, removing and separating the material from a waste material adjacent the material on the work surface.

Many modifications and other versions of the disclosure will come to mind to one skilled in the art to which this disclosure pertains having the benefit of the teachings presented in the foregoing descriptions and the associated drawings. The versions described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

What is claimed is:

1. A scalable area gripper comprising:
   a structural frame; and
   a plurality of variable vacuum zones coupled to the structural frame, each variable vacuum zone comprising:
      (i) three or more vacuum ports;
      (ii) two movable barrier elements that are closed and impermeable, and nonintersecting; and
      (iii) an actuator assembly configured to move each of the two movable barrier elements across the three or more vacuum ports, to cause the three or more vacuum ports to go between a closed state and an open state, and wherein a number of the three or more vacuum ports is greater than a number of the two movable barrier elements,
   wherein one or more of the plurality of variable vacuum zones is configured to be adjusted, to each provide an adjusted vacuum zone that corresponds to a corresponding identified section of a material in a form of a ply section having a start portion and an end portion, and the two movable barrier elements are moved by the actuator assembly to the start portion and to the end portion, respectively, to adjust the adjusted vacuum zone, and
   further wherein each adjusted vacuum zone is configured to be positioned adjacent to its corresponding identified section of the material in the form of the ply section, and is configured to be activated to pick up the material in the form of the ply section during a material handling process.

2. The scalable area gripper of claim 1, wherein the scalable area gripper is coupled to a control system comprising:
   a position controller configured to operably control positioning of the scalable area gripper with respect to the material in the form of the ply section;
   an actuator assembly controller configured to operably control the actuator assembly, to move each of the two movable barrier elements across the three or more vacuum ports; and
   a computer configured to process a software program, the software program configured to determine boundaries of the material in the form of the ply section, and to calculate the start portion and the end portion, based on the boundaries of the material in the form of the ply section.

3. The scalable area gripper of claim 1, wherein the structural frame of the scalable area gripper is configured for attachment to an end effector attached to a robot.

4. The scalable area gripper of claim 1, wherein the structural frame comprises a flat apparatus, and the plurality of variable vacuum zones are disposed across the flat apparatus.

5. The scalable area gripper of claim 1, wherein the structural frame comprises a roller apparatus, and the plurality of variable vacuum zones are disposed circumferentially along the roller apparatus.

6. The scalable area gripper of claim 1, wherein each of the two movable barrier elements comprises a mechanical seal, including a flat elastomeric seal or a flat gasket seal.

7. The scalable area gripper of claim 1, wherein each of the two movable barrier elements comprises a retractable mechanical shield seal, including a belt shield assembly.

8. The scalable area gripper of claim 1, wherein each of the two movable barrier elements comprises a magnetic zipper seal assembly.

9. The scalable area gripper of claim 1, wherein the actuator assembly comprises one of a rotary actuator assembly, and a linear actuator assembly, the linear actuator assembly including a motor driven pulley and cable actuator assembly, a magnet drive assembly, a rack and pinion actuator assembly, a belt drive assembly, and a screw drive assembly.

10. An automated material handling system for a material handling process in composite manufacturing, the automated material handling system comprising:
   a material in a form of a ply to be picked up and removed from a work surface;
   a robot with an end effector;
   a scalable area gripper system comprising:
      a scalable area gripper having a structural frame and a plurality of variable vacuum zones coupled to the structural frame, each variable vacuum zone comprising:
         (i) three or more vacuum ports;
         (ii) two movable barrier elements that are closed and impermeable, and nonintersecting; and
         (iii) an actuator assembly configured to move each of the two movable barrier elements across the three or more vacuum ports, to cause the three or more vacuum ports to go between a closed state and an open state, and wherein a number of the three or more vacuum ports is greater than a number of the two movable barrier elements; and
      a control system coupled to the scalable area gripper; and
   a vacuum system coupled to the scalable area gripper, the vacuum system having a vacuum source to provide air flow through the three or more vacuum ports in the open state,
   wherein the scalable area gripper system is configured to adjust one or more of the plurality of variable vacuum zones, to each provide an adjusted vacuum zone that corresponds to a corresponding identified section of the material in the form of the ply section having a start portion and an end portion, and the two movable barrier elements are moved by the actuator assembly to the start portion and to the end portion, respectively, to adjust the adjusted vacuum zone, and further wherein the scalable area gripper system is configured to position each adjusted vacuum zone adjacent to its corresponding identified section of the material in the form of the ply, and is configured to activate the adjusted vacuum zone, to pick up and remove the material in the form of the ply from the work surface during the material handling process in the composite manufacturing.

11. The automated material handling system of claim 10, wherein the control system comprises:
    a position controller configured to operably control positioning of the scalable area gripper with respect to the material in the form of the ply;
    an actuator assembly controller configured to operably control the actuator assembly, to move each of the two movable barrier elements across the three or more vacuum ports; and
    a computer configured to process a software program, the software program configured to determine boundaries of the material in the form of the ply, and to calculate the start portion and the end portion, based on the boundaries of the material in the form of the ply.

12. The automated material handling system of claim 10, wherein the structural frame comprises a flat apparatus, and the plurality of variable vacuum zones are disposed across the flat apparatus.

13. The automated material handling system of claim 10, wherein the structural frame comprises a roller apparatus, and the plurality of variable vacuum zones are disposed circumferentially along the roller apparatus.

14. The automated material handling system of claim 10, wherein each of the two movable barrier elements comprises one of, a mechanical seal, including a flat elastomeric seal or a flat gasket seal, a magnetic zipper seal assembly, and a retractable mechanical shield seal, including a belt shield assembly.

15. A method for picking up a ply in a material handling process for composite manufacturing, the method comprising the steps of:
    providing a scalable area gripper system comprising:
        a scalable area gripper having a structural frame and a plurality of variable vacuum zones coupled to the structural frame, each variable vacuum zone comprising:
            (i) three or more vacuum ports;
            (ii) two movable barrier elements that are closed and impermeable, and nonintersecting; and
            (iii) an actuator assembly configured to move each of the two movable barrier elements across the three or more vacuum ports, to cause the three or more vacuum ports to go between a closed state and an open state, and wherein a number of the three or more vacuum ports is greater than a number of the two movable barrier elements; and
        a control system coupled to the scalable area gripper;
    coupling the scalable area gripper to a vacuum system and to an end effector attached to a robot;
    identifying, with the control system, a plurality of sections of the ply;
    identifying, with the control system, a start portion and an end portion of each identified section of the ply, based on ply boundaries of the ply;
    adjusting one or more of the plurality of variable vacuum zones, to each provide an adjusted vacuum zone that corresponds to its corresponding identified section of the ply, and the two movable barrier elements are moved by the actuator assembly to the start portion and to the end portion, respectively, to adjust the adjusted vacuum zone;
    positioning the adjusted vacuum zone adjacent to its corresponding identified section of the ply;
    activating the adjusted vacuum zone to provide air flow, with the vacuum system, through the three or more vacuum ports along the adjusted vacuum zone; and
    picking up the ply, with the scalable area gripper, from a work surface, during the material handling process for the composite manufacturing.

16. The method of claim 15, wherein providing the scalable area gripper system further comprises, providing the scalable area gripper system comprising the scalable area gripper having the structural frame comprising a flat apparatus, where the plurality of variable vacuum zones are disposed across the flat apparatus.

17. The method of claim 15, wherein providing the scalable area gripper system further comprises, providing the scalable area gripper system comprising the scalable area gripper having the structural frame comprising a roller apparatus, where the plurality of variable vacuum zones are disposed circumferentially along the roller apparatus.

18. The method of claim 15, wherein providing the scalable area gripper system further comprises, providing the scalable area gripper system comprising the scalable area gripper having the two movable barrier elements each comprising one of, a mechanical seal, including a flat elastomeric seal or a flat gasket seal, a magnetic zipper seal assembly, and a retractable mechanical shield seal, including a belt shield assembly.

19. The method of claim 15, further comprising opening and closing the magnetic zipper seal assembly using one of, magnetic attraction forces and magnetic repulsion forces from separate control magnets located between each side of a magnetic seal of the magnetic zipper seal assembly, or located external to the magnetic seal of the magnetic zipper seal assembly, or a physical mechanism to open and close the magnetic zipper seal assembly.

20. The method of claim 15, wherein picking up the ply further comprises, removing and separating the ply from a waste material adjacent the ply on the work surface.

* * * * *

UNITED STATES PATENT AND TRADEMARK OFFICE
CERTIFICATE OF CORRECTION

| | | |
|---|---|---|
| PATENT NO. | : 11,951,697 B2 | Page 1 of 1 |
| APPLICATION NO. | : 17/548580 | |
| DATED | : April 9, 2024 | |
| INVENTOR(S) | : Shaun A. McFetridge and Benjamin S. Zielinski | |

It is certified that error appears in the above-identified patent and that said Letters Patent is hereby corrected as shown below:

In the Claims

Column 36, Claim 10, Line 58: Please delete the word "section" after "ply"

Signed and Sealed this
Seventh Day of May, 2024

Katherine Kelly Vidal
*Director of the United States Patent and Trademark Office*